(12) United States Patent
Nainar et al.

(10) Patent No.: US 10,659,283 B2
(45) Date of Patent: May 19, 2020

(54) REDUCING ARP/ND FLOODING IN CLOUD ENVIRONMENT

(71) Applicant: CISCO TECHNOLOGY, INC., San Jose, CA (US)

(72) Inventors: Nagendra Kumar Nainar, Morrisville, NC (US); Rajiv Asati, Morrisville, NC (US); Carlos M. Pignataro, Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 105 days.

(21) Appl. No.: 15/206,113

(22) Filed: Jul. 8, 2016

(65) Prior Publication Data

US 2018/0013611 A1 Jan. 11, 2018

(51) Int. Cl.
*H04L 29/12* (2006.01)
*H04L 12/713* (2013.01)
*H04L 12/741* (2013.01)
*G06F 9/455* (2018.01)
(Continued)

(52) U.S. Cl.
CPC ........ *H04L 29/12028* (2013.01); *G06F 9/455* (2013.01); *G06F 9/45504* (2013.01); *H04L 45/32* (2013.01); *H04L 61/103* (2013.01); *H04L 61/1552* (2013.01); *H04L 61/20* (2013.01); *H04L 61/6022* (2013.01); *G06F 2009/45583* (2013.01); *H04L 45/586* (2013.01);
(Continued)

(58) Field of Classification Search
CPC ............... H04L 29/12028; H04L 61/20; H04L 61/6022; H04L 61/103; H04L 45/32; H04L 45/586; H04L 45/745; H04L 49/70; G06F 9/455; G06F 2009/45583
See application file for complete search history.

(56) References Cited

U.S. PATENT DOCUMENTS

| 5,812,773 | A | 9/1998 | Norin |
| 5,889,896 | A | 3/1999 | Meshinsky et al. |
| 6,108,782 | A | 8/2000 | Fletcher et al. |

(Continued)

FOREIGN PATENT DOCUMENTS

| CN | 101719930 | 6/2010 |
| CN | 101394360 B | 7/2011 |

(Continued)

OTHER PUBLICATIONS

U.S. Appl. No. 15/236,447, filed Aug. 14, 2016, entitled "Reducing ARP/ND Flooding in Cloud Environment," Inventors: Nagendra Kumar Nainar, et al.

(Continued)

*Primary Examiner* — Joshua Kading
(74) *Attorney, Agent, or Firm* — Polsinelli PC

(57) ABSTRACT

Aspects of the embodiments are directed to receiving an address resolution protocol (ARP) request message from a requesting virtual machine, the ARP request message comprising a request for a destination address for a destination virtual machine, wherein the destination address comprises one or both of a destination hardware address or a destination media access control address; augmenting the ARP request message with a network service header (NSH), the NSH identifying an ARP service function; and forwarding the augmented ARP request to the ARP service function.

9 Claims, 17 Drawing Sheets

(51) Int. Cl.
*H04L 12/721* (2013.01)
*H04L 12/931* (2013.01)

(52) U.S. Cl.
CPC ............ *H04L 45/66* (2013.01); *H04L 45/745* (2013.01); *H04L 49/70* (2013.01)

(56) References Cited

U.S. PATENT DOCUMENTS

| | | |
|---|---|---|
| 6,178,453 B1 | 1/2001 | Mattaway et al. |
| 6,298,153 B1 | 10/2001 | Oishi |
| 6,343,290 B1 | 1/2002 | Cossins et al. |
| 6,643,260 B1 | 11/2003 | Kloth et al. |
| 6,683,873 B1 | 1/2004 | Kwok et al. |
| 6,721,804 B1 | 4/2004 | Rubin et al. |
| 6,733,449 B1 | 5/2004 | Krishnamurthy et al. |
| 6,735,631 B1 | 5/2004 | Oehrke et al. |
| 6,885,670 B1 | 4/2005 | Regula |
| 6,996,615 B1 | 2/2006 | McGuire |
| 7,054,930 B1 | 5/2006 | Cheriton |
| 7,058,706 B1 | 6/2006 | Lyer et al. |
| 7,062,571 B1 | 6/2006 | Dale et al. |
| 7,076,397 B2 | 7/2006 | Ding et al. |
| 7,111,177 B1 | 9/2006 | Chauvel et al. |
| 7,212,490 B1 | 5/2007 | Kao et al. |
| 7,277,948 B2 | 10/2007 | Igarashi et al. |
| 7,313,667 B1 | 12/2007 | Pullela et al. |
| 7,379,846 B1 | 5/2008 | Williams et al. |
| 7,480,672 B2 | 1/2009 | Hahn et al. |
| 7,496,043 B1 | 2/2009 | Leong et al. |
| 7,536,476 B1 | 5/2009 | Alleyne |
| 7,567,504 B2 | 7/2009 | Darling et al. |
| 7,606,147 B2 | 10/2009 | Luft et al. |
| 7,647,594 B1 | 1/2010 | Togawa |
| 7,684,322 B2 | 3/2010 | Sand et al. |
| 7,773,510 B2 | 8/2010 | Back et al. |
| 7,808,897 B1 | 10/2010 | Mehta et al. |
| 7,881,957 B1 | 2/2011 | Cohen et al. |
| 7,917,647 B2 | 3/2011 | Cooper et al. |
| 8,010,598 B2 | 8/2011 | Tanimoto |
| 8,028,071 B1 | 9/2011 | Mahalingam et al. |
| 8,041,714 B2 | 10/2011 | Aymeloglu et al. |
| 8,121,117 B1 | 2/2012 | Amdahl et al. |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B1 | 10/2012 | Aymeloglu et al. |
| 8,284,664 B1 | 10/2012 | Aybay et al. |
| 8,284,776 B2 | 10/2012 | Petersen |
| 8,301,746 B2 | 10/2012 | Head et al. |
| 8,345,692 B2 | 1/2013 | Smith |
| 8,406,141 B1 | 3/2013 | Couturier et al. |
| 8,407,413 B1 | 3/2013 | Yucel et al. |
| 8,448,171 B2 | 5/2013 | Donnellan et al. |
| 8,477,610 B2 | 7/2013 | Zuo et al. |
| 8,495,252 B2 | 7/2013 | Lais et al. |
| 8,495,356 B2 | 7/2013 | Ashok et al. |
| 8,510,469 B2 | 8/2013 | Portolani |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,639 B2 | 10/2013 | Murphy et al. |
| 8,560,663 B2 | 10/2013 | Baucke et al. |
| 8,589,543 B2 | 11/2013 | Dutta et al. |
| 8,590,050 B2 | 11/2013 | Nagpal et al. |
| 8,611,356 B2 | 12/2013 | Yu et al. |
| 8,612,625 B2 | 12/2013 | Andries et al. |
| 8,630,291 B2 | 1/2014 | Shaffer et al. |
| 8,639,787 B2 | 1/2014 | Lagergren et al. |
| 8,656,024 B2 | 2/2014 | Krishnan et al. |
| 8,660,129 B1 | 2/2014 | Brendel et al. |
| 8,719,804 B2 | 5/2014 | Jain |
| 8,775,576 B2 | 7/2014 | Hebert et al. |
| 8,797,867 B1 | 8/2014 | Chen et al. |
| 8,805,951 B1 | 8/2014 | Faibish et al. |
| 8,850,182 B1 | 9/2014 | Fritz et al. |
| 8,856,339 B2 | 10/2014 | Mestery et al. |
| 8,909,780 B1 | 12/2014 | Dickinson et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 8,959,526 B2 | 2/2015 | Kansal et al. |
| 8,977,754 B2 | 3/2015 | Curry, Jr. et al. |
| 9,009,697 B2 | 4/2015 | Breiter et al. |
| 9,015,324 B2 | 4/2015 | Jackson |
| 9,043,439 B2 | 5/2015 | Bicket et al. |
| 9,049,115 B2 | 6/2015 | Rajendran et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,104,334 B2 | 8/2015 | Madhusudana et al. |
| 9,164,795 B1 | 10/2015 | Vincent |
| 9,167,050 B2 | 10/2015 | Durazzo et al. |
| 9,201,701 B2 | 12/2015 | Boldyrev et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,251,114 B1 | 2/2016 | Ancin et al. |
| 9,264,478 B2 | 2/2016 | Hon et al. |
| 9,313,048 B2 | 4/2016 | Chang et al. |
| 9,361,192 B2 | 6/2016 | Smith et al. |
| 9,380,075 B2 | 6/2016 | He et al. |
| 9,432,294 B1 | 8/2016 | Sharma et al. |
| 9,444,744 B1 | 9/2016 | Sharma et al. |
| 9,473,365 B2 | 10/2016 | Melander et al. |
| 9,503,530 B1 | 11/2016 | Niedzielski |
| 9,558,078 B2 | 1/2017 | Farlee et al. |
| 9,613,078 B2 | 4/2017 | Vermeulen et al. |
| 9,628,471 B1 | 4/2017 | Sundaram et al. |
| 9,632,858 B2 | 4/2017 | Sasturkar et al. |
| 9,658,876 B2 | 5/2017 | Chang et al. |
| 9,692,802 B2 | 6/2017 | Bicket et al. |
| 9,727,359 B2 | 8/2017 | Tsirkin |
| 9,736,063 B2 | 8/2017 | Wan et al. |
| 9,755,858 B2 | 9/2017 | Bagepalli et al. |
| 9,792,245 B2 | 10/2017 | Raghavan et al. |
| 9,804,988 B1 | 10/2017 | Ayoub et al. |
| 9,954,783 B1 | 4/2018 | Thirumurthi et al. |
| 2002/0004900 A1 | 1/2002 | Patel |
| 2002/0073337 A1 | 6/2002 | Ioele et al. |
| 2002/0143928 A1 | 10/2002 | Maltz et al. |
| 2002/0166117 A1 | 11/2002 | Abrams et al. |
| 2002/0174216 A1 | 11/2002 | Shorey et al. |
| 2003/0018591 A1 | 1/2003 | Komisky |
| 2003/0056001 A1 | 3/2003 | Mate et al. |
| 2003/0228585 A1 | 12/2003 | Inoko et al. |
| 2004/0004941 A1 | 1/2004 | Malan et al. |
| 2004/0095237 A1 | 5/2004 | Chen et al. |
| 2004/0131059 A1 | 7/2004 | Ayyakad et al. |
| 2004/0264481 A1 | 12/2004 | Darling et al. |
| 2005/0060418 A1 | 3/2005 | Sorokopud |
| 2005/0125424 A1 | 6/2005 | Herriott et al. |
| 2006/0059558 A1 | 3/2006 | Selep et al. |
| 2006/0104286 A1 | 5/2006 | Cheriton |
| 2006/0120575 A1 | 6/2006 | Ahn et al. |
| 2006/0126665 A1 | 6/2006 | Ward et al. |
| 2006/0146825 A1 | 7/2006 | Hofstaedter et al. |
| 2006/0155875 A1 | 7/2006 | Cheriton |
| 2006/0168338 A1 | 7/2006 | Bruegl et al. |
| 2006/0294207 A1 | 12/2006 | Barsness et al. |
| 2007/0011330 A1 | 1/2007 | Dinker et al. |
| 2007/0174663 A1 | 7/2007 | Crawford et al. |
| 2007/0223487 A1 | 9/2007 | Kajekar et al. |
| 2007/0242830 A1 | 10/2007 | Conrado et al. |
| 2008/0005293 A1 | 1/2008 | Bhargava et al. |
| 2008/0084880 A1 | 4/2008 | Dharwadkar |
| 2008/0165778 A1 | 7/2008 | Ertemalp |
| 2008/0198752 A1 | 8/2008 | Fan et al. |
| 2008/0201711 A1 | 8/2008 | Amir Husain |
| 2008/0235755 A1 | 9/2008 | Blaisdell et al. |

(56) References Cited

U.S. PATENT DOCUMENTS

| | | |
|---|---|---|
| 2009/0006527 A1 | 1/2009 | Gingell, Jr. et al. |
| 2009/0010277 A1 | 1/2009 | Halbraich et al. |
| 2009/0019367 A1 | 1/2009 | Cavagnari et al. |
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell, III et al. |
| 2009/0182874 A1 | 7/2009 | Morford et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0217886 A1 | 8/2010 | Seren et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325257 A1 | 12/2010 | Goel et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0199902 A1 | 8/2011 | Leavy et al. |
| 2011/0213687 A1 | 9/2011 | Ferris et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0023418 A1 | 1/2012 | Frields et al. |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0166649 A1 | 6/2012 | Watanabe et al. |
| 2012/0167094 A1 | 6/2012 | Suit |
| 2012/0173541 A1 | 7/2012 | Venkataramani |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185632 A1 | 7/2012 | Lais et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0203908 A1 | 8/2012 | Beaty et al. |
| 2012/0204169 A1 | 8/2012 | Breiter et al. |
| 2012/0204187 A1 | 8/2012 | Breiter et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0069950 A1 | 3/2013 | Adam et al. |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185413 A1 | 7/2013 | Beaty et al. |
| 2013/0185433 A1 | 7/2013 | Zhu et al. |
| 2013/0191106 A1 | 7/2013 | Kephart et al. |
| 2013/0198050 A1 | 8/2013 | Shroff et al. |
| 2013/0198374 A1 | 8/2013 | Zalmanovitch et al. |
| 2013/0204849 A1 | 8/2013 | Chacko |
| 2013/0232491 A1 | 9/2013 | Radhakrishnan et al. |
| 2013/0232492 A1 | 9/2013 | Wang |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0315246 A1* | 11/2013 | Zhang ............... H04L 12/56 370/392 |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |

(56) References Cited

U.S. PATENT DOCUMENTS

| | | |
|---|---|---|
| 2014/0006535 A1 | 1/2014 | Reddy |
| 2014/0006585 A1 | 1/2014 | Dunbar et al. |
| 2014/0019639 A1 | 1/2014 | Ueno |
| 2014/0040473 A1 | 2/2014 | Ho et al. |
| 2014/0040883 A1 | 2/2014 | Tompkins |
| 2014/0052877 A1 | 2/2014 | Mao |
| 2014/0059310 A1 | 2/2014 | Du et al. |
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0160924 A1 | 6/2014 | Pfautz et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0269266 A1 | 9/2014 | Filsfils et al. |
| 2014/0280805 A1 | 9/2014 | Sawalha |
| 2014/0282536 A1 | 9/2014 | Dave et al. |
| 2014/0282611 A1 | 9/2014 | Campbell et al. |
| 2014/0282669 A1 | 9/2014 | McMillan |
| 2014/0282889 A1 | 9/2014 | Ishaya et al. |
| 2014/0289200 A1 | 9/2014 | Kato |
| 2014/0297569 A1 | 10/2014 | Clark et al. |
| 2014/0297835 A1 | 10/2014 | Buys |
| 2014/0314078 A1 | 10/2014 | Jilani |
| 2014/0317261 A1 | 10/2014 | Shatzkamer et al. |
| 2014/0366155 A1 | 12/2014 | Chang et al. |
| 2014/0372567 A1 | 12/2014 | Ganesh et al. |
| 2015/0006470 A1 | 1/2015 | Mohan |
| 2015/0033086 A1 | 1/2015 | Sasturkar et al. |
| 2015/0043335 A1 | 2/2015 | Testicioglu et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St Laurent et al. |
| 2015/0058459 A1 | 2/2015 | Amendjian et al. |
| 2015/0058557 A1 | 2/2015 | Madhusudana et al. |
| 2015/0070516 A1 | 3/2015 | Shoemake et al. |
| 2015/0071285 A1 | 3/2015 | Kumar et al. |
| 2015/0071289 A1* | 3/2015 | Shin .................. H04L 45/745 370/392 |
| 2015/0089478 A1 | 3/2015 | Cheluvaraju et al. |
| 2015/0100471 A1 | 4/2015 | Curry, Jr. et al. |
| 2015/0106802 A1 | 4/2015 | Ivanov et al. |
| 2015/0106805 A1 | 4/2015 | Melander et al. |
| 2015/0109923 A1 | 4/2015 | Hwang |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0149828 A1 | 5/2015 | Mukerji et al. |
| 2015/0178133 A1 | 6/2015 | Phelan et al. |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0271199 A1 | 9/2015 | Bradley et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0373108 A1 | 12/2015 | Fleming et al. |
| 2015/0379062 A1 | 12/2015 | Vermeulen et al. |
| 2016/0011925 A1 | 1/2016 | Kulkarni et al. |
| 2016/0013990 A1 | 1/2016 | Kulkarni et al. |
| 2016/0062786 A1 | 3/2016 | Meng et al. |
| 2016/0065417 A1 | 3/2016 | Sapuram et al. |
| 2016/0094398 A1 | 3/2016 | Choudhury et al. |
| 2016/0094480 A1 | 3/2016 | Kulkarni et al. |
| 2016/0094643 A1 | 3/2016 | Jain et al. |
| 2016/0094894 A1 | 3/2016 | Inayatullah et al. |
| 2016/0099847 A1 | 4/2016 | Melander et al. |
| 2016/0099873 A1 | 4/2016 | Gerö et al. |
| 2016/0103838 A1 | 4/2016 | Sainani et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0147676 A1 | 5/2016 | Cha et al. |
| 2016/0162436 A1 | 6/2016 | Raghavan et al. |
| 2016/0164914 A1 | 6/2016 | Madhav et al. |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2016/0292611 A1 | 10/2016 | Boe et al. |
| 2016/0352682 A1 | 12/2016 | Chang |
| 2016/0378389 A1 | 12/2016 | Hrischuk et al. |
| 2017/0005948 A1 | 1/2017 | Melander et al. |
| 2017/0024260 A1 | 1/2017 | Chandrasekaran et al. |
| 2017/0026470 A1 | 1/2017 | Bhargava et al. |
| 2017/0034199 A1 | 2/2017 | Zaw |
| 2017/0041342 A1 | 2/2017 | Efremov et al. |
| 2017/0054659 A1 | 2/2017 | Ergin et al. |
| 2017/0063674 A1 | 3/2017 | Maskalik et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0118166 A1* | 4/2017 | Du .................... H04L 61/103 |
| 2017/0126583 A1 | 5/2017 | Xia |
| 2017/0126615 A1* | 5/2017 | Chanda .............. H04L 61/103 |
| 2017/0147297 A1 | 5/2017 | Krishnamurthy et al. |
| 2017/0163569 A1* | 6/2017 | Koganti .............. H04L 49/25 |
| 2017/0171158 A1 | 6/2017 | Hoy et al. |
| 2017/0192823 A1 | 7/2017 | Karaje et al. |
| 2017/0264663 A1 | 9/2017 | Bicket et al. |
| 2017/0302521 A1 | 10/2017 | Lui et al. |
| 2017/0310556 A1 | 10/2017 | Knowles et al. |
| 2017/0317932 A1 | 11/2017 | Paramasivam |
| 2017/0339070 A1 | 11/2017 | Chang et al. |
| 2018/0069885 A1 | 3/2018 | Patterson et al. |
| 2018/0173372 A1 | 6/2018 | Greenspan et al. |
| 2018/0174060 A1 | 6/2018 | Velez-Rojas et al. |
| 2019/0158997 A1* | 5/2019 | Starsinic .............. H04W 4/70 |

FOREIGN PATENT DOCUMENTS

| | | |
|---|---|---|
| CN | 102164091 A | 8/2011 |
| CN | 104320342 A | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |

OTHER PUBLICATIONS

Fang K., "LISP MAC-EID-TO-RLOC Mapping (LISP based L2VPN)," Network Working Group Internet Draft, draft-zhiyfang-lisp-mac-eid-00, Jan. 2012; 12 pages.

(56) References Cited

OTHER PUBLICATIONS

Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015; 22 pages.
Amedro, Brian, et al., "An Efficient Framework for Running Applications on Clusters, Grids and Cloud," 2010, 17 pages.
Author Unknown, "A Look at DeltaCloud: The Multi-Cloud API," Feb. 17, 2012, 4 pages.
Author Unknown, "About Deltacloud," Apache Software Foundation, Aug. 18, 2013, 1 page.
Author Unknown, "Architecture for Managing Clouds, A White Paper from the Open Cloud Standards Incubator," Version 1.0.0, Document No. DSP-IS0102, Jun. 18, 2010, 57 pages.
Author Unknown, "Cloud Infrastructure Management Interface—Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "cloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 2014, 4 pages.
Author Unknown, "Use Cases and Interactions for Managing Clouds, A White Paper from the Open Cloud Standards Incubator," Version 1.0.0, Document No. DSP-IS00103, Jun. 16, 2010, 75 pages.
Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Kunz, Thomas, et al., "OmniCloud—The Secure and Flexible Use of Cloud Storage Services," 2014, 30 pages.
Logan, Marcus, "Hybrid Cloud Application Architecture for Elastic Java-Based Web Applications," F5 Deployment Guide Version 1.1, 2016, 65 pages.
Lynch, Sean, "Monitoring cache with Claspin" Facebook Engineering, Sep. 19, 2012, 5 pages.
Meireles, Fernando Miguel Dias, "Integrated Management of Cloud Computing Resources," 2013-2014, 286 pages.
Mu, Shuai, et al., "uLibCloud: Providing High Available and Uniform Accessing to Multiple Cloud Storages," 2012 IEEE, 8 pages.
Sun, Aobing, et al., "IaaS Public Cloud Computing Platform Scheduling Model and Optimization Analysis," Int. J. Communications, Network and System Sciences, 2011, 4, 803-811, 9 pages.
Szymaniak, Michal, et al., "Latency-Driven Replica Placement", vol. 47 No. 8, IPSJ Journal, Aug. 2006, 12 pages.
Toews, Everett, "Introduction to Apache jclouds," Apr. 7, 2014, 23 pages.
Von Laszewski, Gregor, et al., "Design of a Dynamic Provisioning System for a Federated Cloud and Bare-metal Environment," 2012, 8 pages.
Ye, Xianglong, et al., "A Novel Blocks Placement Strategy for Hadoop," 2012 IEEE/ACTS 11$^{th}$ International Conference on Computer and Information Science, 2012 IEEE, 5 pages.
Author Unknown, "5 Benefits of a Storage Gateway in the Cloud," Blog, TwinStrata, Inc., Jul. 25, 2012, XP055141645, 4 pages,
https://web.archive.org/web/20120725092619/http://blog.twinstrata.com/2012/07/10//5-benefits-of-a-storage-gateway-in-the-cloud.
Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.
Author Unknown, "Open Data Center Alliance Usage: Virtual Machine (VM) Interoperability in a Hybrid Cloud Environment Rev. 1.2," Open Data Center Alliance, Inc., 2013, 18 pages.
Author Unknown, "Real-Time Performance Monitoring on Juniper Networks Devices, Tips and Tools for Assessing and Analyzing Network Efficiency," Juniper Networks, Inc., May 2010, 35 pages.
Beyer, Steffen, "Module "Data::Locations"?!," YAPC::Europe, London, UK,ICA, Sep. 22-24, 2000, XP002742700, 15 pages.
Borovick, Lucinda, et al., "Architecting the Network for the Cloud," IDC White Paper, Jan. 2011, 8 pages.
Bosch, Greg, "Virtualization," last modified Apr. 2012 by B. Davison, 33 pages.
Broadcasters Audience Research Board, "What's Next," http://Iwww.barb.co.uk/whats-next, accessed Jul. 22, 2015, 2 pages.
Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform into the Cloud," Jan. 6, 2014, Las Vegas, Nevada, Press Release, 3 pages.
CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.
Herry, William, "Keep it Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology," http://www.nielsen-admosphere.eu/products-and-services/simmetry-audience-measurement-technology/, accessed Jul. 22, 2015, 6 pages.
Nielsen, "Television " http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.

(56) References Cited

OTHER PUBLICATIONS

Shunra, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.
Wikipedia, "Filter (software)", Wikipedia, Feb. 8, 2014, 2 pages, https://en.wikipedia.org/w/index.php?title=Filter %28software%29 &oldid=594544359.
Wikipedia; "Pipeline (Unix)", Wikipedia, May 4, 2014, 4 pages, https://en.wikipedia.org/w/index.php?title=Pipeline2/028Unix%29 &oldid=606980114.
Extended European Search Report from the European Patent Office for the corresponding European Patent Application No. EP17180216.8, dated Nov. 2, 2017, 14 pages.
Al-Harbi, S.H., et al., "Adapting k-means for supervised clustering," Jun. 2006, Applied Intelligence, vol. 24, Issue 3, pp. 219-226.
Bohner, Shawn A., "Extending Software Change Impact Analysis into COTS Components," 2003, IEEE, 8 pages.
Hood, C. S., et al., "Automated Proactive Anomaly Detection," 1997, Springer Science and Business Media Dordrecht, pp. 688-699.
Vilalta R., et al., "An efficient approach to external cluster assessment with an application to martian topography," Feb. 2007, 23 pages, Data Mining and Knowledge Discovery 14.1: 1-23. New York: Springer Science & Business Media.

\* cited by examiner

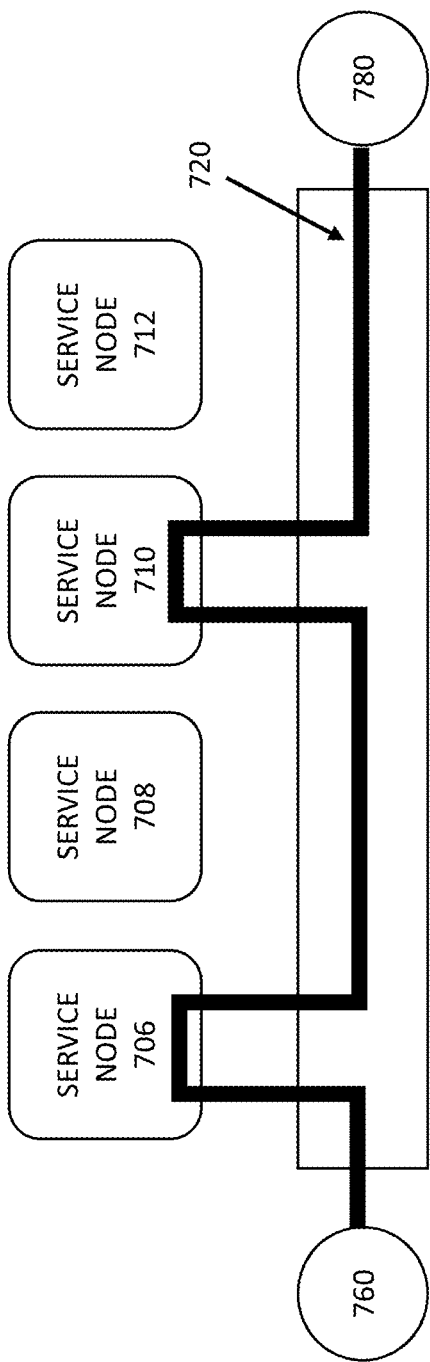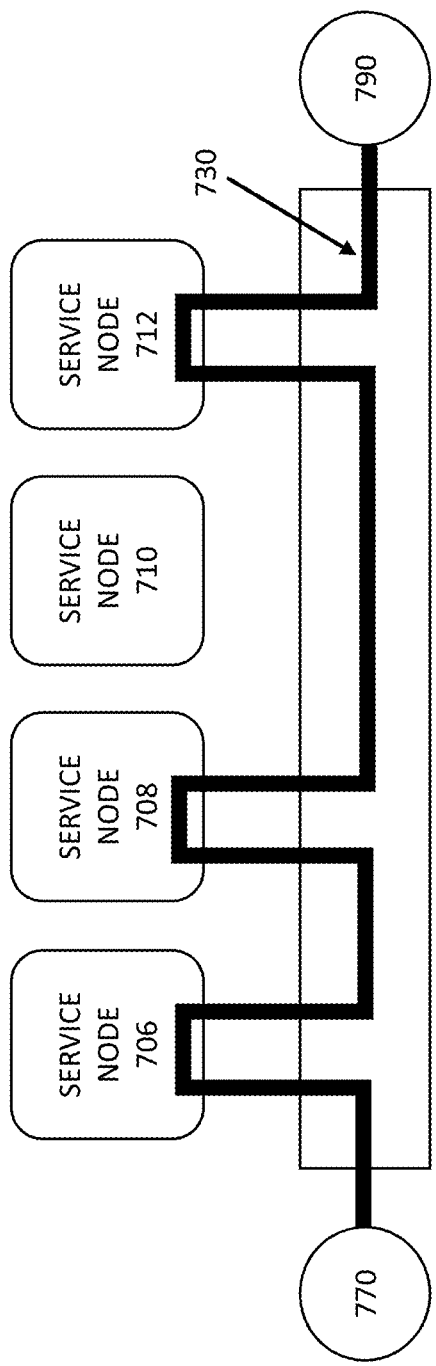
FIG. 7B
FIG. 7C

REDUCING ARP/ND FLOODING IN CLOUD ENVIRONMENT

FIELD

This disclosure pertains to reducing address resolution protocol (ARP) and/or neighbor discovery (ND) in a cloud environment.

BACKGROUND

Currently in Virtual Private cloud, Hybrid Cloud or Data center scenarios, it is common to see different Layer 2 network/sites are connected using various overlay technologies (like EVPN, VxLAN, NVO3, etc.). In these scenarios, the Overlay Edge Node (e.g. NVE, PE) uses dataplane based MAC learning and exchange the MAC reachability over BGP. The Overlay Edge node (e.g. NVE, PE) can also perform ND/ARP snooping for additional optimization and advertise the IP/MAC reachability info via BGP, so that any Edge Node (e.g. NVE, PE), upon receiving ND/ARP requests from connected L2 devices (e.g. Virtual Machines VMs) would check the local cache table for existing ND/ARP entries and reply directly to the connected L2 devices, if appropriate match is found. If there is no match found, then Edge Node would flood the request to remote Edge Nodes and wait for the reply.

FIG. 1 is a block diagram of an example network 100. In FIG. 1, a Host2 108 in L2Site2 110 has not originated any traffic. If a Host1 102 from L2Site1 104 is sending an ND/ARP request for Host2, the ND/ARP request will be flooded by network virtualization edge network element (NVE1) 106 to all remote NVE (NVE2 112 and NVE3 118 in this scenario), which in turn will flood the ND/ARP request to other connected L2 sites. The same flooding issue is observed if the MAC entry is timed out on the NVEs for any MAC. This flooding becomes a challenge in large scale data center deployments.

It is possible that an orchestrator network element, such as a controller, is made aware of the IP/MAC address of the network function virtualization (NFV)/virtual machine (VM) instances, thereby allowing controllers to exchange the IP/MAC address reachability details with adjacent NVEs. However, this still does not address the above flooding challenge, as NVEs are still required to rely on data plane (learning and/or ND/ARP snooping) and control plane (e.g. BGP advertisements /withdrawal).

BRIEF DESCRIPTION OF THE DRAWINGS

In FIG. 1, a Host2 in L2Site2 has not originated any traffic.

FIG. 7B-7C illustrate different service paths realized using service function chaining, according to some embodiments of the disclosure.

DETAILED DESCRIPTION

Figure 1:
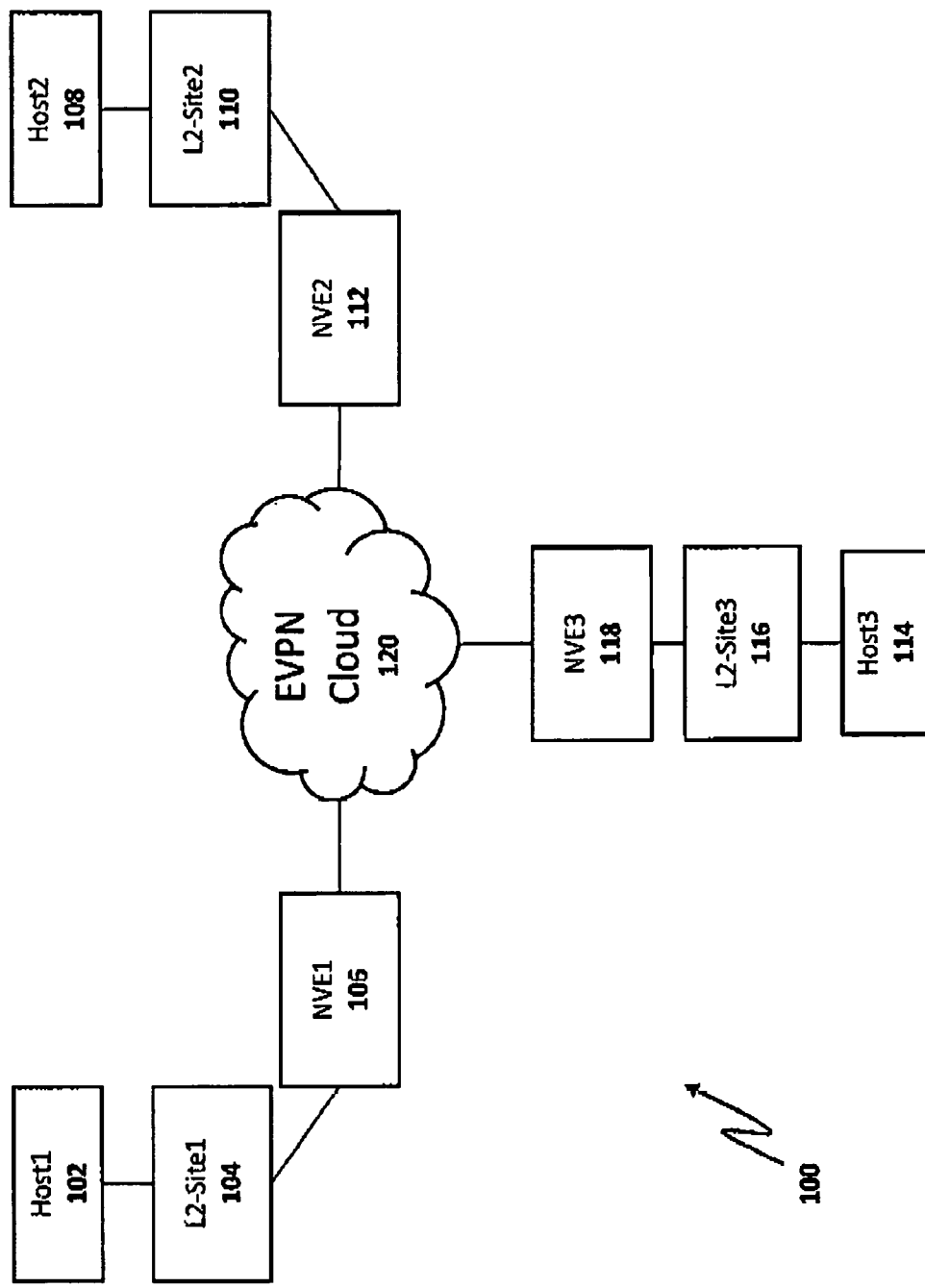
FIG. 1 is a block diagram of an example network topology.

This disclosure describes leveraging a controller's knowledge about the IP/MAC address of spawned VM/service function (SF)/NFV instances and prepopulate the same as an address resolution protocol service function (ARP-SF) on each L2 sites. NVE sniffs the ARP request from connected site and forwards the ARP to an ARP-SF after encapsulating the ARP request with a network service (NSH) header.

Aspects of the embodiments are directed to one or more computer readable storage media encoded with software comprising computer executable instructions and when the software is executed operable to receive an address resolution protocol (ARP) request message from a requesting virtual machine, the ARP request message comprising a request for a destination address for a destination virtual machine, wherein the destination address comprises one or both of a destination hardware address or a destination media access control address; augment the ARP request message with a network service header (NSH), the NSH identifying an ARP service function; and forward the augmented ARP request to the ARP service function.

In some embodiments, the software is further operable to receive an ARP reply message from the ARP service function; decapsulate a network service header from the ARP reply message; and forward the decapsulated ARP reply message to the requesting virtual machine, the ARP reply message including a destination address for a destination virtual machine.

In some embodiments, wherein the software is further operable to update a forwarding table with the destination address for the destination virtual machine.

In some embodiments, the software is further operable to determine, from the ARP reply message received from the ARP service function, that the destination address for the destination virtual machine is not present in an ARP service function database; and transmit an ARP request message to one or more network elements in a network.

Aspects of the embodiments are directed to a network element for performing address resolution, the network element comprising at least one memory element having instruction stored thereon; at least one processor coupled to the at least one memory element and configured to execute the instructions to cause the service classifier node to receive an address resolution protocol (ARP) request message from a requesting virtual machine, the ARP request message comprising a request for a destination address for a destination virtual machine, wherein the destination address comprises one or both of a destination hardware address or a destination media access control address; augment the ARP request message with a network service header (NSH), the NSH identifying an ARP service function; and forwarding the augmented ARP request to the ARP service function.

In some embodiments, the at least one processor configured to cause the network element to receive an ARP reply message from the ARP service function; decapsulate a network service header from the ARP reply message; and forward the decapsulated ARP reply message to the requesting virtual machine, the ARP reply message including a destination address for a destination virtual machine.

In some embodiments, the at least one processor configured to cause the network element to update a forwarding table with the destination address for the destination virtual machine.

In some embodiments, the network element comprises a network virtualization edge network element.

In some embodiments, the at least one processor configured to cause the network element to determine, from the ARP reply message received from the ARP service function, that the destination address for the destination virtual machine is not present in an ARP service function database; and transmit an ARP request message to one or more network elements in a network.

Aspects of the embodiments are directed to one or more computer readable storage media encoded with software comprising computer executable instructions and when the software is executed operable to receive, at an address resolution protocol (ARP) service function, an ARP request message from a network element; perform a lookup in an ARP database associated with the ARP service function; generate an ARP reply message; forward the ARP reply message to the network element.

In some embodiments, the software is further operable to determine the presence in the ARP database of a destination address for a destination virtual machine identified in the ARP request message, wherein the destination address comprises one or both of a destination hardware address or a destination media access control address; and augment the ARP reply message with the destination address for the destination virtual machine.

In some embodiments, the software is further operable to determine the presence in the ARP database of a destination address for a destination virtual machine identified in the ARP request message, wherein the destination address comprises one or both of a destination hardware address or a destination media access control address; determine that the virtual machine is a local virtual machine based, at least in part, on the destination address of the destination virtual machine; and ignore the ARP request message.

In some embodiments, determine that a destination address for a destination virtual machine identified in the ARP request message does not exist in the ARP database; wherein generating an ARP reply message comprises generating an ARP reply message that includes a network service header that indicates the absence of the destination address for the destination.

In some embodiments, the software is further operable to receive from a controller one or more virtual machine destination addresses, and for each virtual machine destination address, a corresponding virtual machine identifier; and storing the one or more virtual machine destination address and corresponding virtual machine identifier in a database, wherein the destination address comprises one or both of a destination hardware address or a destination media access control address.

Aspects of the embodiments are directed to a network element for performing address resolution, the network element comprising at least one memory element having instruction stored thereon; at least one processor coupled to the at least one memory element and configured to execute the instructions to cause the service classifier node to receive, at an address resolution protocol (ARP) service function, an ARP request message from a network element; perform a lookup in an ARP database associated with the ARP service function; generate an ARP reply message; forward the ARP reply message to the network element.

In some embodiments, the at least one processor configured to cause the network element to determine the presence in the ARP database of a destination address for a destination virtual machine identified in the ARP request message; and augment the ARP reply message with the destination address for the destination virtual machine; wherein the destination address comprises one or both of a destination hardware address or a destination media access control address.

In some embodiments, the at least one processor configured to cause the network element to determine the presence in the ARP database of a destination address for a destination virtual machine identified in the ARP request message; determine that the virtual machine is a local virtual machine based, at least in part, on the destination address of the destination virtual machine; and ignore the ARP request message; wherein the destination address comprises one or both of a destination hardware address or a destination media access control address.

In some embodiments, the at least one processor configured to cause the network element to determine that a destination address for a destination virtual machine identified in the ARP request message does not exist in the ARP database; wherein generating an ARP reply message comprises encapsulating the APR request message; setting a flag in the network service header to flood the APR request, and forwarding the ARP request message to the network element that includes a network service header that indicates the absence of the destination address for the destination.

In some embodiments, the at least one processor configured to cause the network element to receive from a controller one or more virtual machine destination addresses, and for each virtual machine destination address, a corresponding virtual machine identifier; and storing the one or more virtual machine destination address and corresponding virtual machine identifier in a database.

In some embodiments, wherein the destination address comprises one or both of an internet protocol (IP) or media access control (MAC) address.

Aspects of the embodiments are directed to an NVE that is configured to receive the ND/ARP request message from the requesting VM. The NVE can look up a BGP table for the destination address (hardware address or MAC address) information for the destination VM. The NVE can create a reply, and send the reply message to the VM. The NVE can also update the forwarding table, the entry of which would expire after some time period.

The ARP-SF replies back with the details if it has the same in local database. Else will signal the NVE to flood the request. Scalable and dynamic way of reducing the ARP flooding.

The idea is to dedicate one or more Service Functions (SF), dubbed as ND/ARP-SF that keeps track of IP/MAC details of each VM instance in local and remote L2 sites, and provide the IP/MAC reachability information to the Overlay Edge Node (e.g. NVE, PE) when requested using Network Services Header (NSH) mechanism.

Overlay Edge Node does NOT populate the IP/MAC reachability information in its forwarding table by default, until/unless there is a corresponding traffic. This is because the IP/MAC reachability details are outsourced to ND/ARP-SF.

ND/ARP-SF Service Function is populated with the IP/MAC details of each VM instance, after it is spun up, and deleted when VM instance is deleted. To make this happen (updating the IP/MAC details per VM), ND/ARP-SF communicates (using APIs (e.g. REST) preferably in pub/sub manner) with either Virtual Infra Manager (VIM) such as vCenter, Openstack, etc. or a controller such as Virtual Topology System (VTS), etc. depending on the deployment model.

Note that there could be more than one ND/ARP-SF and more than one VIM/Controllers for scale purposes. Controllers are typically used on top of VIM for scale purposes.

The IP/MAC reachability details are exchanged among the controllers of different sites using any (REST) API or BGPEVPN. This consolidated information is populated in ARP-SF.

FIGS. 2A-2E are schematic diagrams of a network topology 200 in accordance with embodiments of the present disclosure. Topology 200 includes a first site (Site1) 202. Site1 202 can include one or more instantiated virtual machines, such as VM1 206a and VM9 206b. Though shown as two VMs, any site can include a plurality of VM instantiations.

ND/ARP-SF Service Function is populated with the IP/MAC details of each VM instance, after it is spun up, and deleted when VM instance is deleted. To make this happen (updating the IP/MAC details per VM), ND/ARP-SF communicates (using APIs (e.g. REST) preferably in pub/sub manner) with a controller 240 (which can be either Virtual Infra Manager (VIM) such as vCenter, Openstack, etc. or a controller such as Virtual Topology System (VTS), etc. depending on the deployment model). The controller 240 can populate an ARP-SF database 210.

Site1 202 includes a network virtualization edge (NVE1) 204. A network Virtualization Edge (NVE) is a component in Network Virtualization Overlays Technology. An NVE can provide different types of virtualized network services to multiple tenants, i.e. an L2 service or an L3 service. Note that an NVE may be capable of providing both L2 and L3 services for a tenant.

An L2 NVE implements Ethernet LAN emulation, an Ethernet based multipoint service similar to an IETF VPLS, or EVPN service, where the Tenant Systems appear to be interconnected by a LAN environment over an L3 overlay. As such, an L2 NVE provides per-tenant virtual switching instance (L2 VNI), and L3 (IP/MPLS) tunneling encapsulation of tenant MAC frames across the underlay. Note that the control plane for an L2 NVE could be implemented locally on the NVE or in a separate control entity.

The site1 202 can also include an address resolution protocol service function (ARP-SF) 208. ARP-SF 208 can maintain or access an ARP-SF database that cross references IP addresses/MAC addresses and remote NVEs for destination address resolution.

Other sites, such as site2 212 and site3 222 can include similar features. For example, site2 212 includes NVE2 214, VM2 216 (instantiated VM), and ARP-SF 218. Site3 222 includes NVE3 224, instantiated VM3 226, and ARP-SF 228. The sites can be connected through a cloud service provider 230. A controller 240 can provide orchestration and other control functions for each site or for all sites, collectively. Controller 240 can include a virtual infrastructure management (VIM) network element. In embodiments, the controller 240 can populate the APR-SF database 210. In embodiments, the ARP-SF database 210 can also be populated by the NVE forwarding table.

Figure 2A:
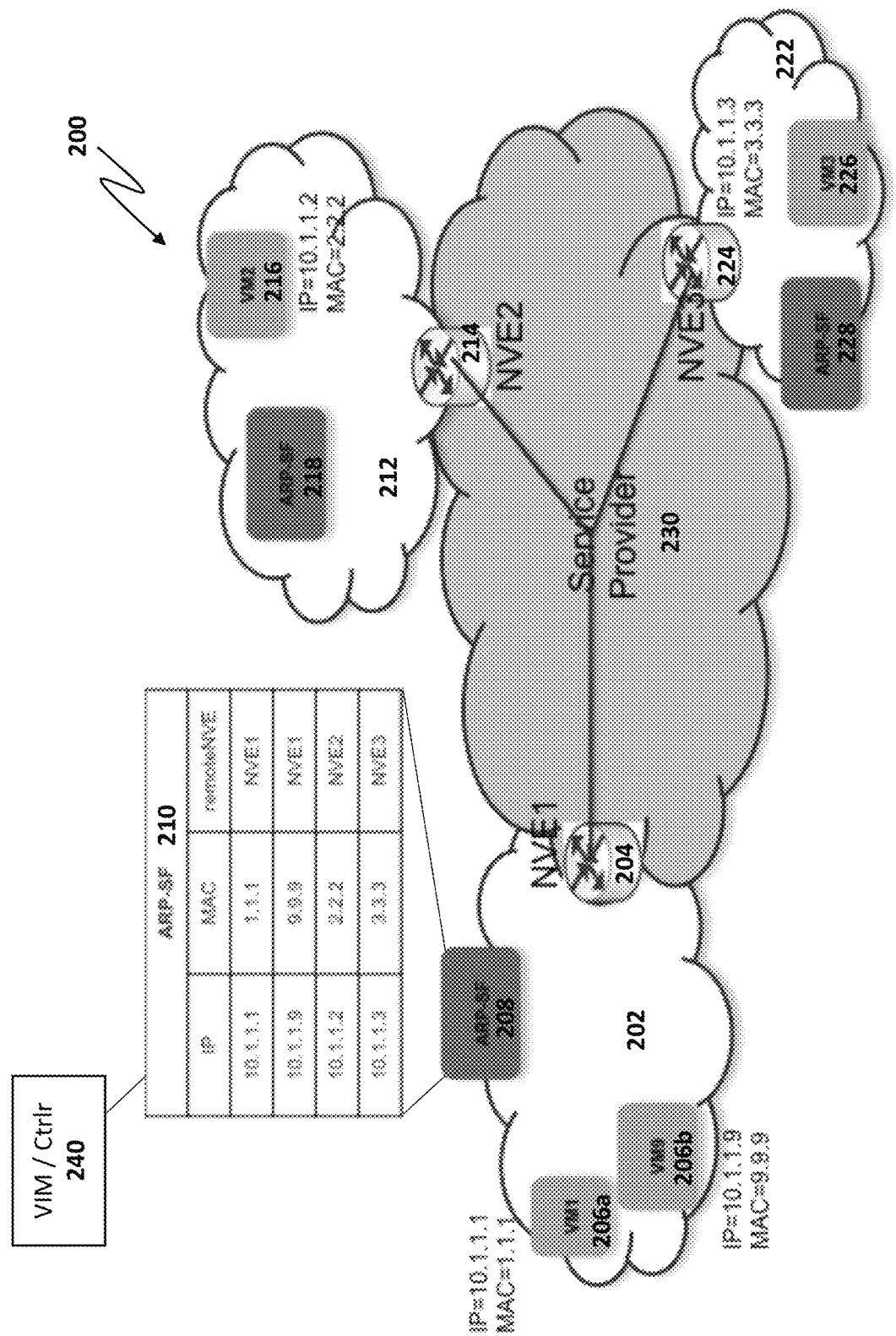
FIGS. 2A-2E are schematic diagrams of a network topology in accordance with embodiments of the present disclosure.
Figure 2B:
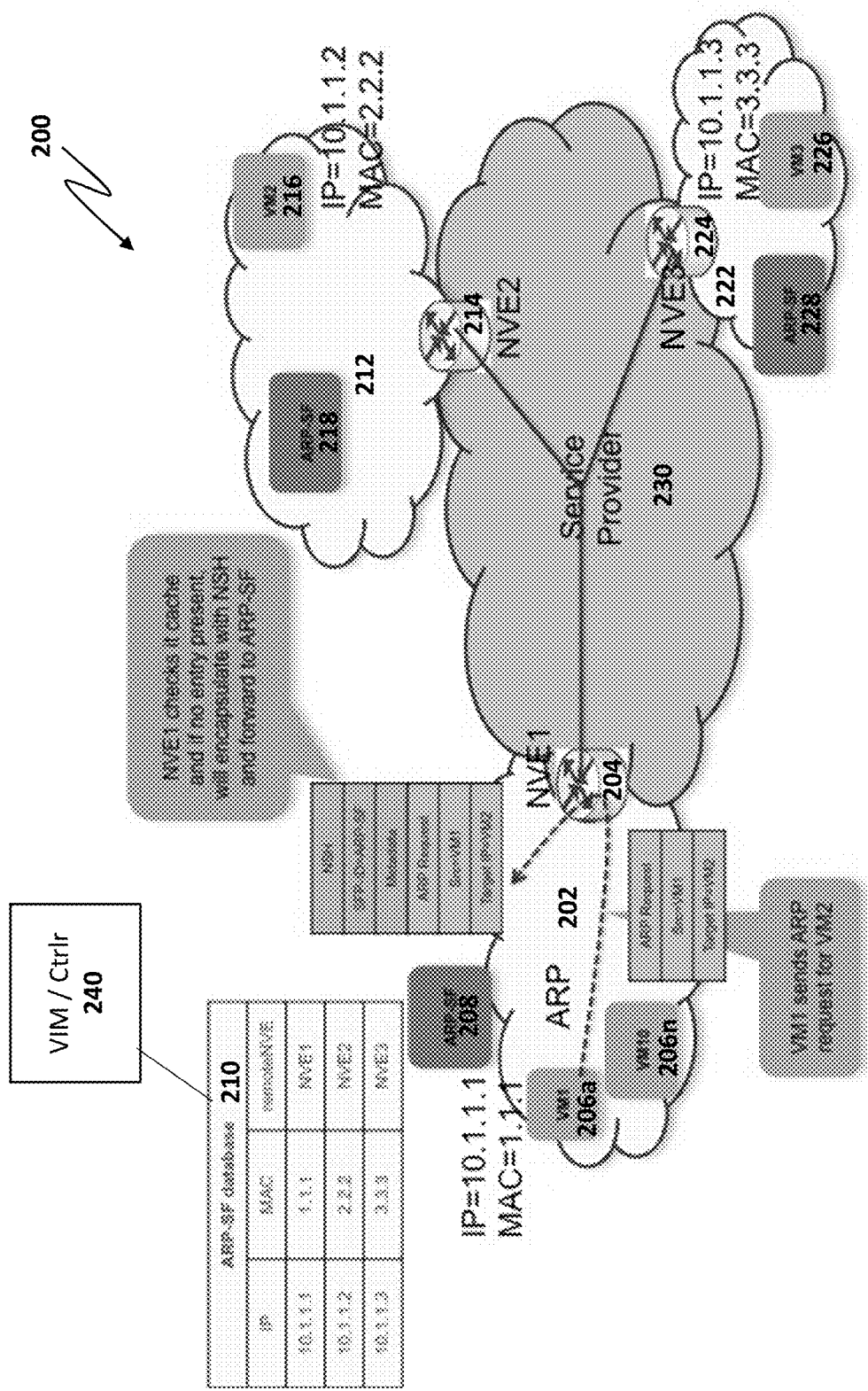

In the topology 200 shown in FIG. 2B, NVE1 204 can receive an ND/ARP request from a device (e.g., VM1 206a in local L2 site1 202). In this example, the ND/ARP request can be a request for VM2 216 in L2 site2 212. NVE1 204 can encapsulate the request in a network service header (NSH). NVE1 204 can forward the encapsulated ND/ARP request towards the ARP-SF 208. In embodiments, the APR-SF 208 can also handle neighbor discovery (ND) requests.

Figure 2C:
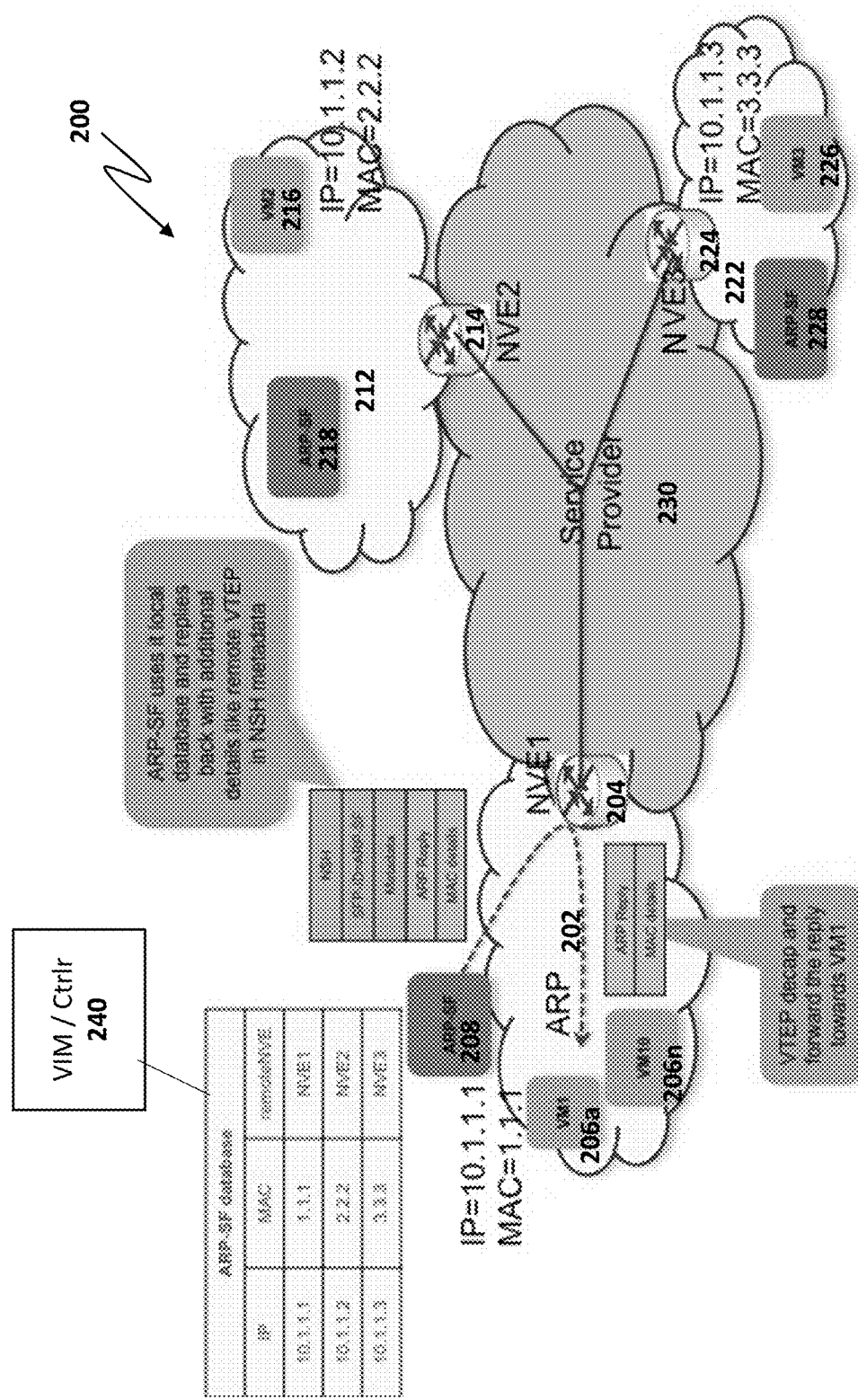

As shown in FIG. 2C, the ARP-SF 208 can process the request by performing a lookup in database 210. If a match is found for VM2 in database 210, the ARP-SF 208 can generate the ND/ARP reply, encapsulate it with an NSH header (along with the remoteNVE associated with that VM entry, a VXLAN tunnel endpoint (VTEP), etc., in the NSH metadata) and unicast it to the NVE1 204.

NVE1 on receiving the reply can use the details (IP/MAC and remoteNVE in metadata) to update NVE's forwarding table (e.g., cache table, shown in FIG. 3A), decapsulate the reply from the ARP-SF 208, and forward the ND/ARP reply towards the originating device (here, VM1 206a). For example, ARP-SF 208 can reply back with {IP=10.1.1.2; MAC=2.2.2;remoteNVE=NVE2} to NVE1. NVE1 will program the details locally, decapsulate the network service header, and send the reply to VM1. By using stored information in the ARP-SF database 210, the NVE1 204 in this scenario can forgo flooding the ND/ARP request.

In embodiments, the NVE could be configured to not redirect the ND/ARP reply for certain ranges of IP prefixes to avoid having the NVE try to resolve requests originated in local sites (since the underlay or overlay could implicitly resolve such requests).

In some embodiments, the VM1 can floods a request for VM10 206n, which is in the L2 Site1 202. All nodes in L2Site1 (including NVE1 and VM10) will receive the request. NVE1 will encapsulate with NSH header and forward to ARP-SF. Since VM10 is local, ARP-SF will simply ignore it. In the meantime, VM10 206n will reply back to VM1 206a with the address resolution.

Figure 2D:
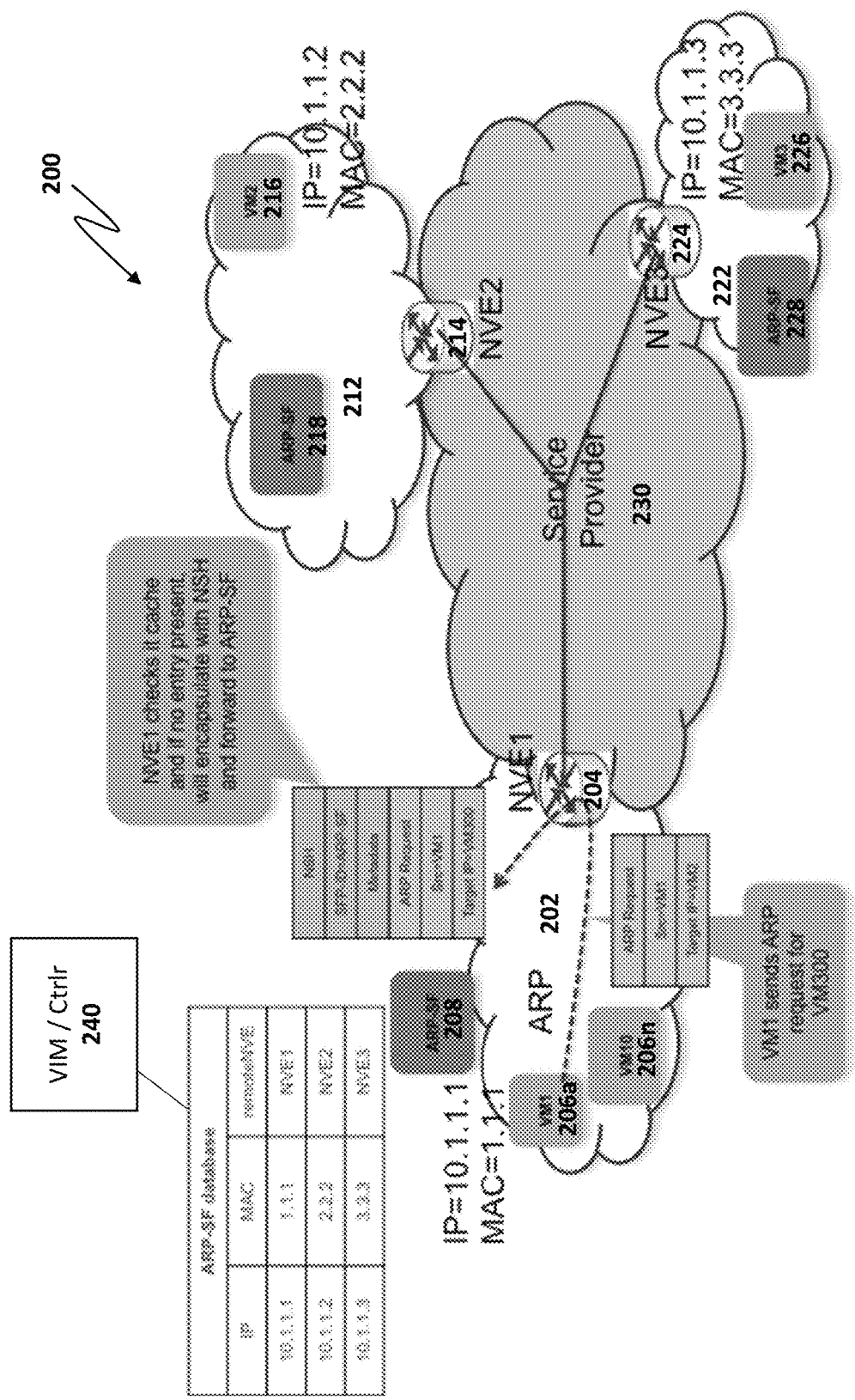

FIG. 2D is a schematic diagram of a network topology in accordance with embodiments of the present disclosure wherein the ARP-SF 208 cannot resolve the ND/ARP request (e.g., because the ARP-SF 208 does not have MAC details in database 210). As shown in FIG. 2D, VM1 206a sends a request for VM300 206n. NVE1 204 can check its cache (forwarding) table for VM300 information. When the NVE1 204 does not have IP/MAC information for VM300, NVE1 can encapsulate the ARP request with an NSH header and forward the encapsulated APR request to ARP-SF 208.

Figure 2E:
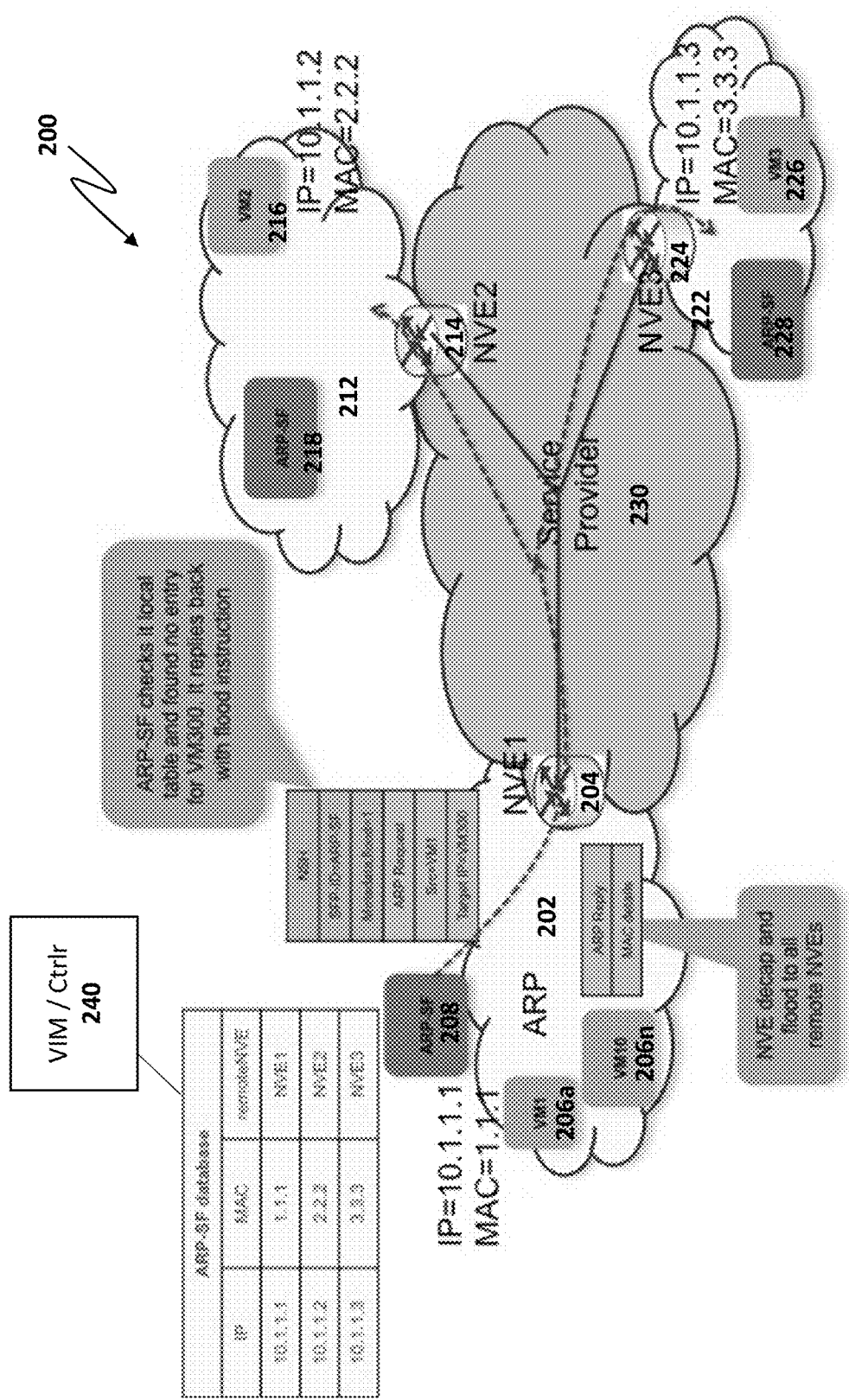

In FIG. 2E, ARP-SF 208, after receiving the request from NVE1 204, will reply back with relevant details (including a flag in Metadata) signaling that it does not have any local entry for V300, NVE1 204, after receiving such reply will flood the APR request to all remote NVEs (e.g., NVE2 214 and NVE3 224). This is a backward compatible way and will not cause any packet loss if ARP-SF 208 has not been updated with the MAC details.

The above concept does not require the NVE to be loaded with details of all other nodes in remote sites. Instead uses a scalable manner of spinning ARP-SF instances as required and have the NVE to redirect the request to ARP-SF and thereby reduce the flooding.

Figure 3A:
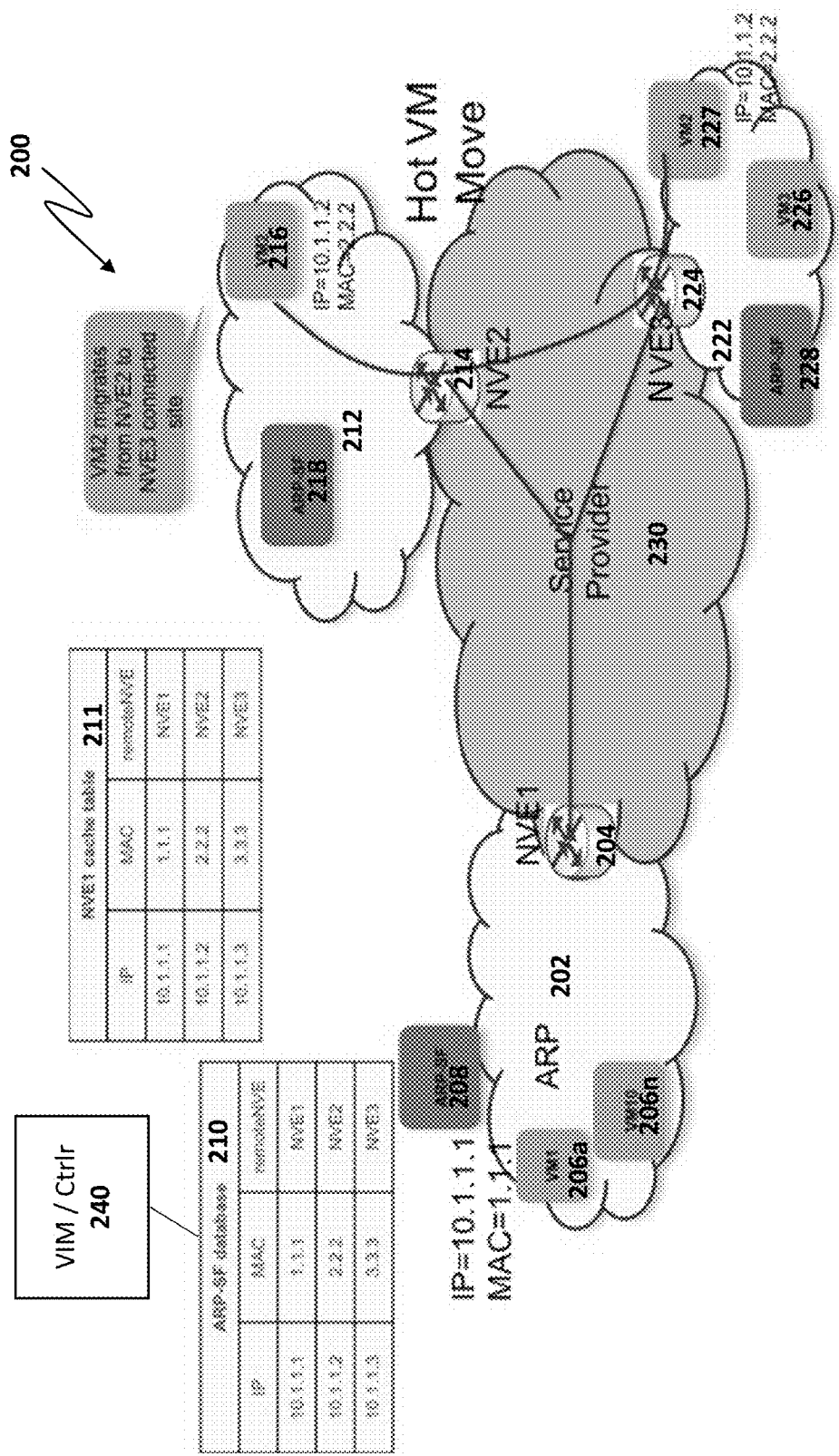
FIG. 3A-3B are schematic diagrams of a network topology with virtual machine migration in accordance with embodiments of the present disclosure.
Figure 3B:
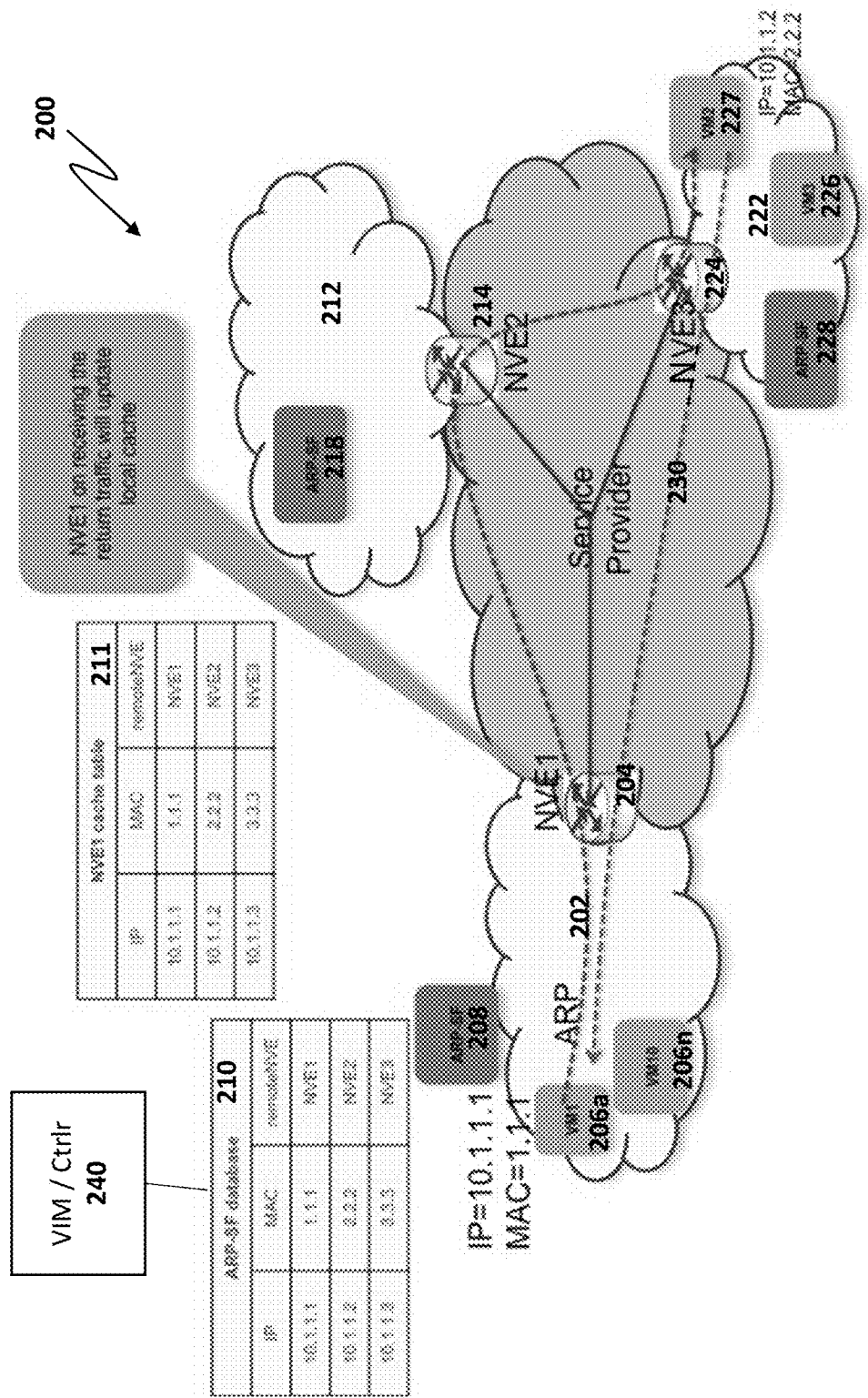

VM Move Scenario:

FIGS. 3A-3B are schematic diagrams of a network topology for reducing address resolution flooding for a virtual machine that has moved in accordance with embodiments of the present disclosure. In FIG. 3A, VM2 216 undergoes VM migration from site2 212 to site3 222. In embodiments, VM migration does not involve any change in IP/MAC associated instance. For example, VM2 216 from site2 212 can migrate to site3 (shown as VM2 227 in FIG. 3B). So during such scenarios, all ARP-SFs in different L2Sites will be programmed with new details (like the remote NVE details, etc.). For example, a local ARP-SF 228 can inform a central controller (e.g., VIM/controller), which can publish the move to other ARP-SFs.

When VM1 206a sends a new ARP request for the MAC address for VM2 216 within an L2 site and if the local NVE1 204 does not have an entry for that MAC in its forwarding table, then NVE1 204 simply relies on the process (as described above) to learn the latest binding from ARP-SF 208.

However, if NVE1 204 does have an entry (which might be stale) for that MAC for VM2 216 in its forwarding table (pointing to the old remote NVE2 214), then one of two embodiments could apply (depending on Stateful or Stateless ARP-SF logic):

(a) Stateful ARP-SF: a stateful ARP-SF would retain the identity of each NVE that interacted with ARP-SF for each IP/MAC. The stateful ARP-SF could send the updated IP/MAC: NVE binding info to NVE on an unsolicited basis using a NSH (new flag could be set), as soon as ARP-SF learns about the updated info (from the controller 240).

(b) Stateless ARP-SF: A stateless ARP-SF does not keep track of which NVE interacted for what IP/MAC:NVE binding. The NVE would follow the current dataplane learning (and flooding) to update its local forwarding table. Note that given the redirection by remote NVE, there would be minimal or no loss.

The above concepts do not require the NVE to be loaded with details of all other nodes in remote sites. Instead, APR-SF instances are spun up scalably and as required and have the NVE to redirect the request to ARP-SF to reduce the flooding.

When a VM is torn down, the VIM/controller 240 can delete the entry from the local ARP-SF instance or from any ARP-SF instance under the control of the VIM/controller 240. In some embodiments, an ARP-SF instance that has an entry deleted can alert other ARP-SF instances to delete entries.

Figure 4:
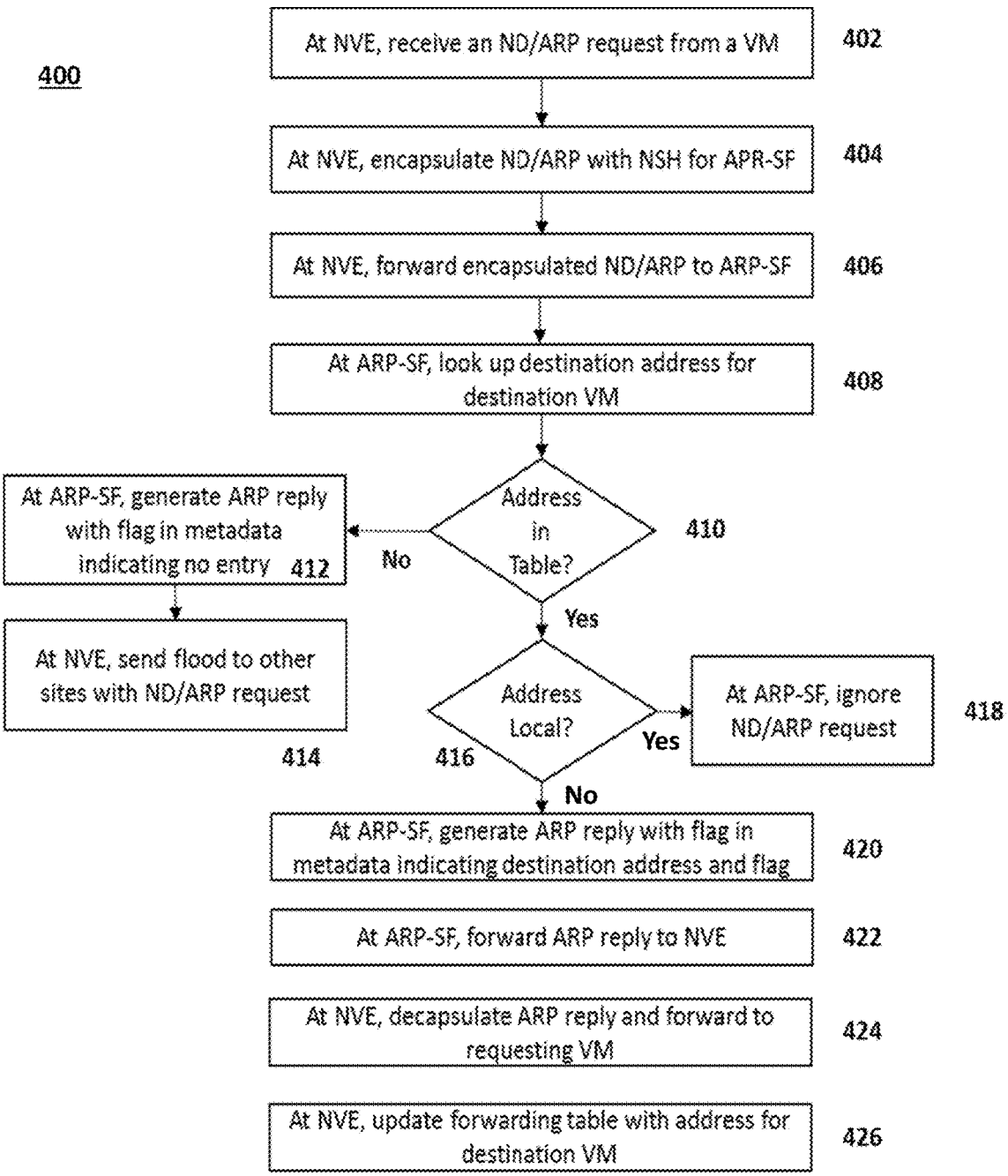
FIG. 4 is a process flow diagram for reducing address protocol resolution flooding in accordance with embodiments of the present disclosure.

FIG. 4 is a process flow diagram 400 for reducing address protocol resolution flooding in accordance with embodiments of the present disclosure. A virtual machine can send an ND/ARP request to an NVE. The NVE can receive the ND/ARP request from the VM (402). The NVE can encapsulate the ND/ARP request with a network service header (NSH) for an ARP-SF instance common to the L2 site of the VM (404). The NVE can forward the encapsulated ND/ARP request to the ARP-SF (406).

The ARP-SF can look up a destination address for the destination VM from a database stored with, associated with, or accessible by the ARP-SF (408). If the address is not in the table, the ARP-SF can generate a reply with a flag in the reply metadata indicating there is no entry for the destination address for the destination VM (412). The ARP-SF can send the reply to the NVE. The NVE can flood the ND/ARP to other NVEs in the network.

If the address is in the ARP-SF table, the ARP-SF can determine whether the address is local to the site of the requesting VM (416). If the destination VM is local, then the ARP-SF can ignore the ND/ARP request because the local VM will respond to the requesting VM (418).

If the destination VM is not local, then the ARP-SF can generate an ARP reply (420). The ARP-SF can encapsulate the ARP reply with an NSH header (along with the remoteNVE associated with that entry in the NSH metadata). The ARP-SF can unicast the encapsulated ARP reply to NVE that redirected the ND/ARP request (422).

At the NVE, the NVE can decapsulate the ARP reply and forward the ARP reply to the requesting VM (424). The NVE can also update its forwarding table with the address in the ARP reply.

Figure 5A:
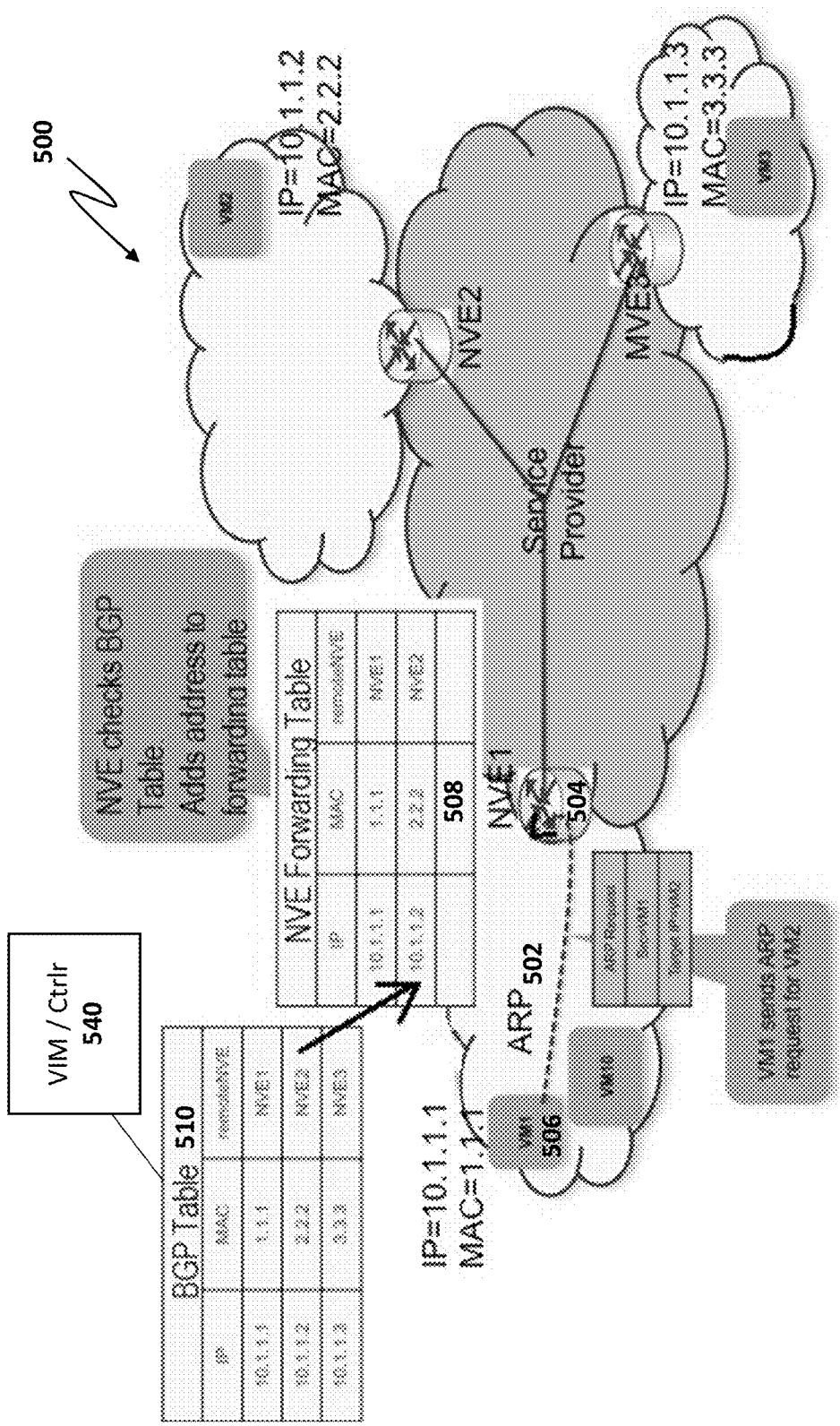
FIG. 5A-5D are schematic diagrams of a network topology that includes a border gateway protocol table in accordance with embodiments of the present disclosure.

FIG. 5A-5D are schematic diagrams of a network topology 500 that includes a border gateway protocol table 510 in accordance with embodiments of the present disclosure. FIG. 5A is a schematic diagram illustrating an overview of the BGP scenario. In scenarios where the number of IP/MAC to be retained is not at massive scale, if all the IP/MAC address reachability are kept in BGP table 510 associated with NVE/PE routers, then (ARP-SF) could be eliminated in these scenarios. The IP/MAC addresses are not installed in the NVE forwarding tables (at first), as well as not advertised further (so remote MAC addresses are not advertised locally).

In that case, the NVE 504 would receive the IP/MAC details from the controller 540 and populate in BGP table 510 (or other local control plane table). VM1 506 would send the ARP to NV/PE1 504, and NV/PE1 504 would look into border gate protocol (BGP) table 510 for that destination IP. If the address exists in the BGP table 510, then the NVE 504 can use the incoming ARP request as a trigger to install the IP/MAC address in the forwarding table 508 of the NVE 504. The NVE 504 can send the ARP reply to VM1 506.

After not being used for a predetermined amount of time, the address information can be purged from forwarding table, but not from the BGP table 510 unless the controller 540 updates the BGP table 510 due to VM tear down/spin up and/or VM migration.

Figure 5B:
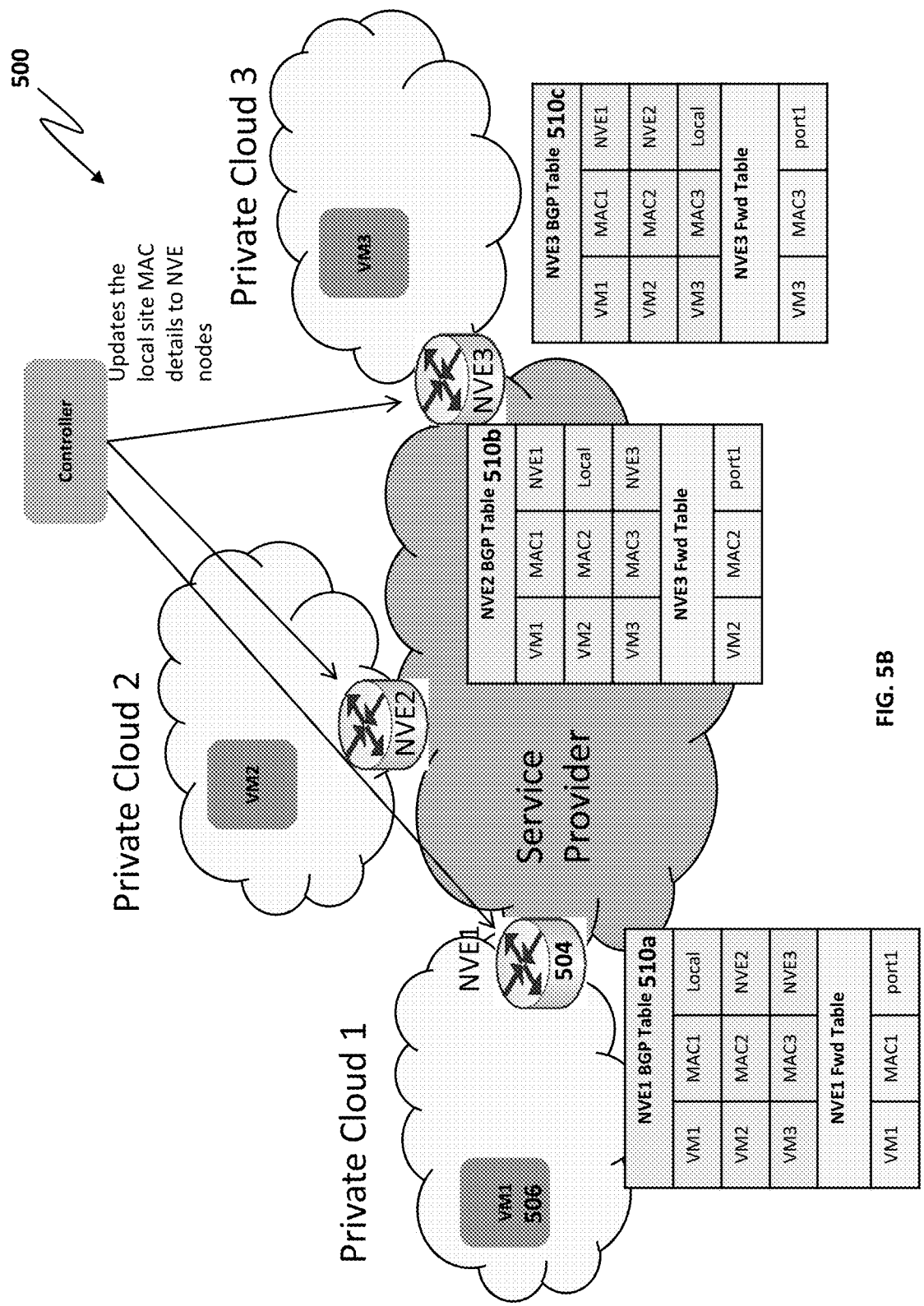

In FIG. 5B, a controller 540 can update BGP tables 510a, 510b, and 510c. The controller 540 can update the local site MAC details to NVE nodes' BGP tables.

Figure 5C:
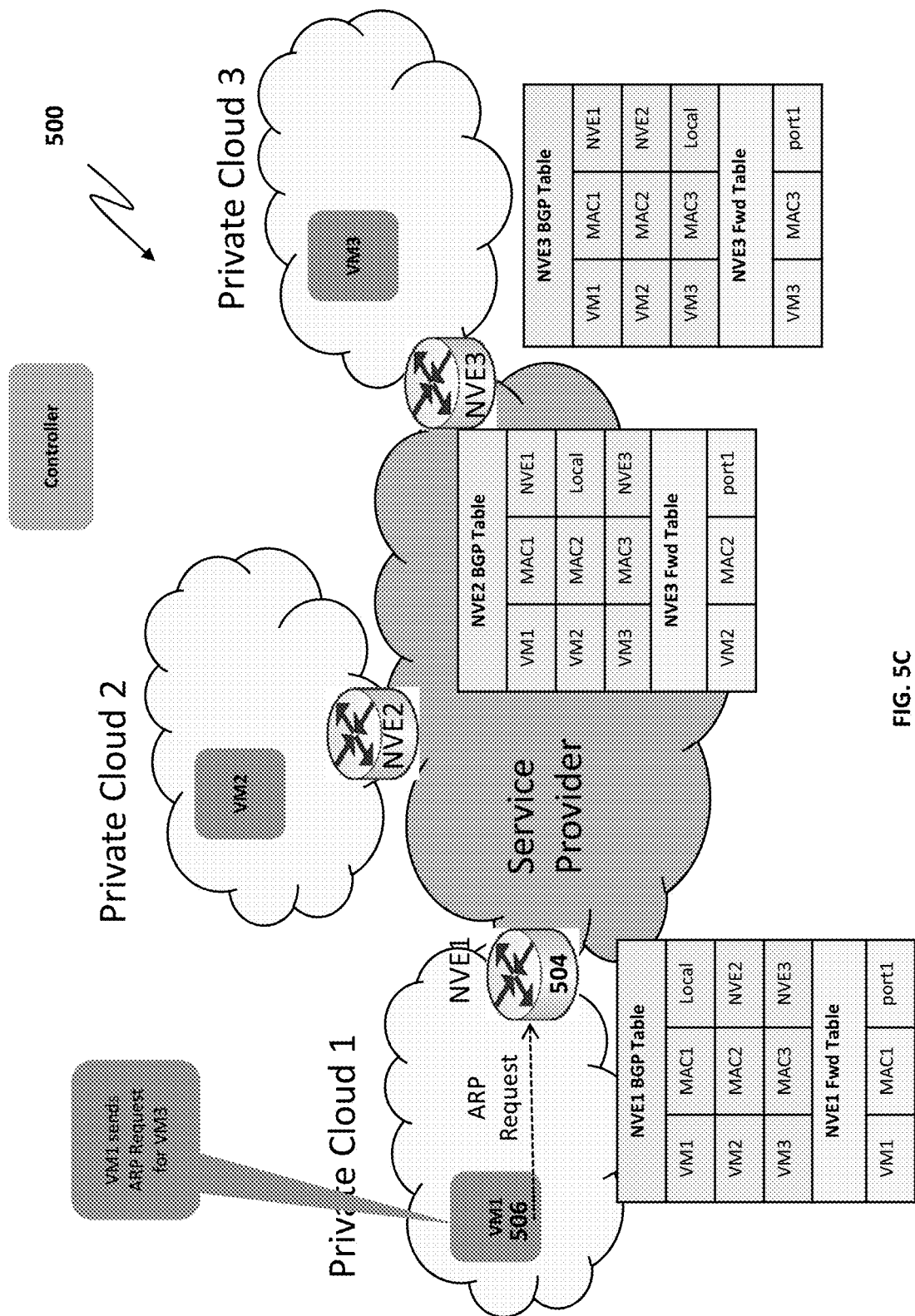
Figure 5D:
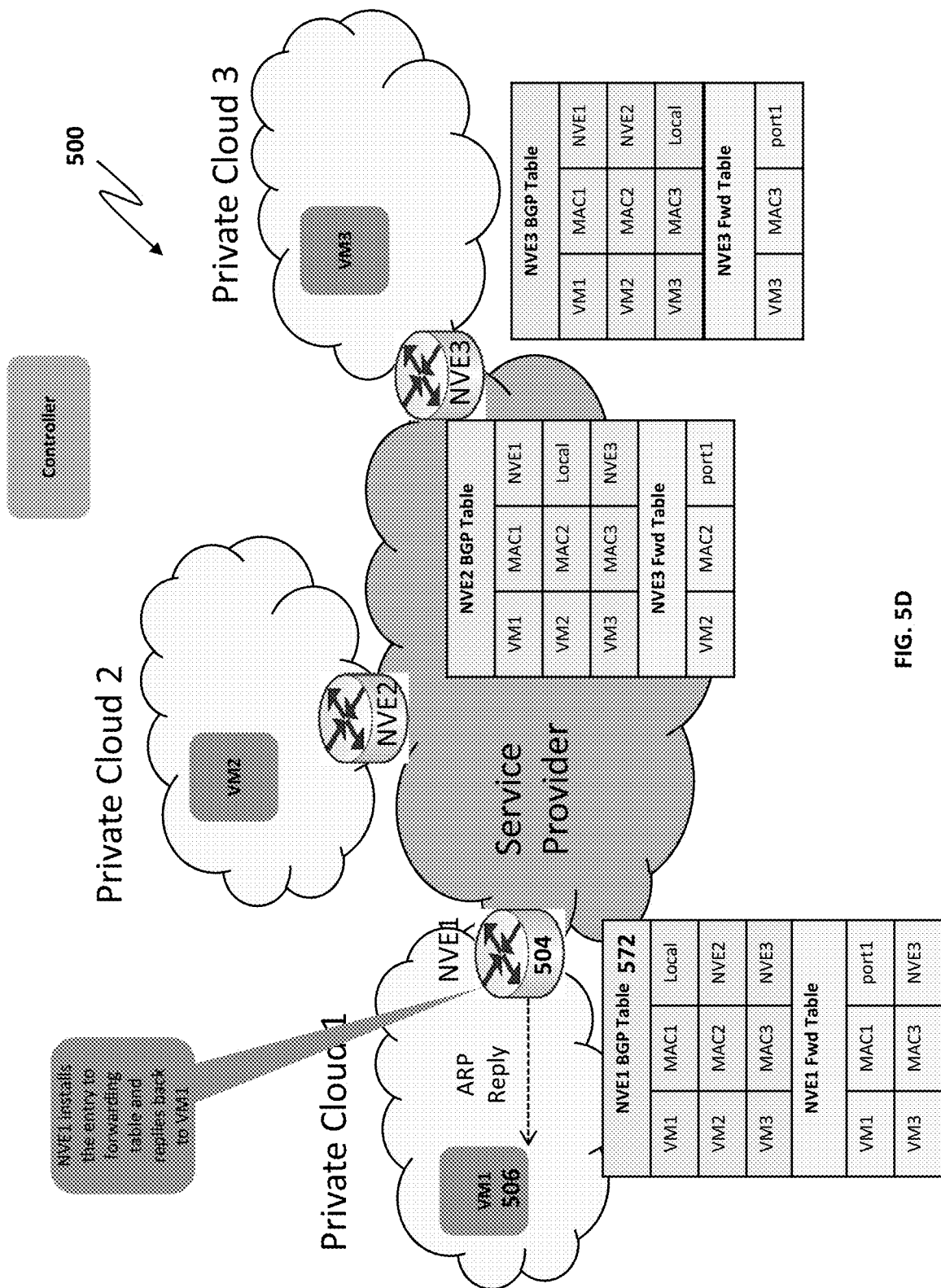

In FIG. 5C, VM1 506 sends an ARP request message to the NVE 504. In FIG. 5D, the NVE checks the BGP table 572. The NVE1 504 installs the BGP entry into the forwarding table and replies back to VM1.

Figure 6:
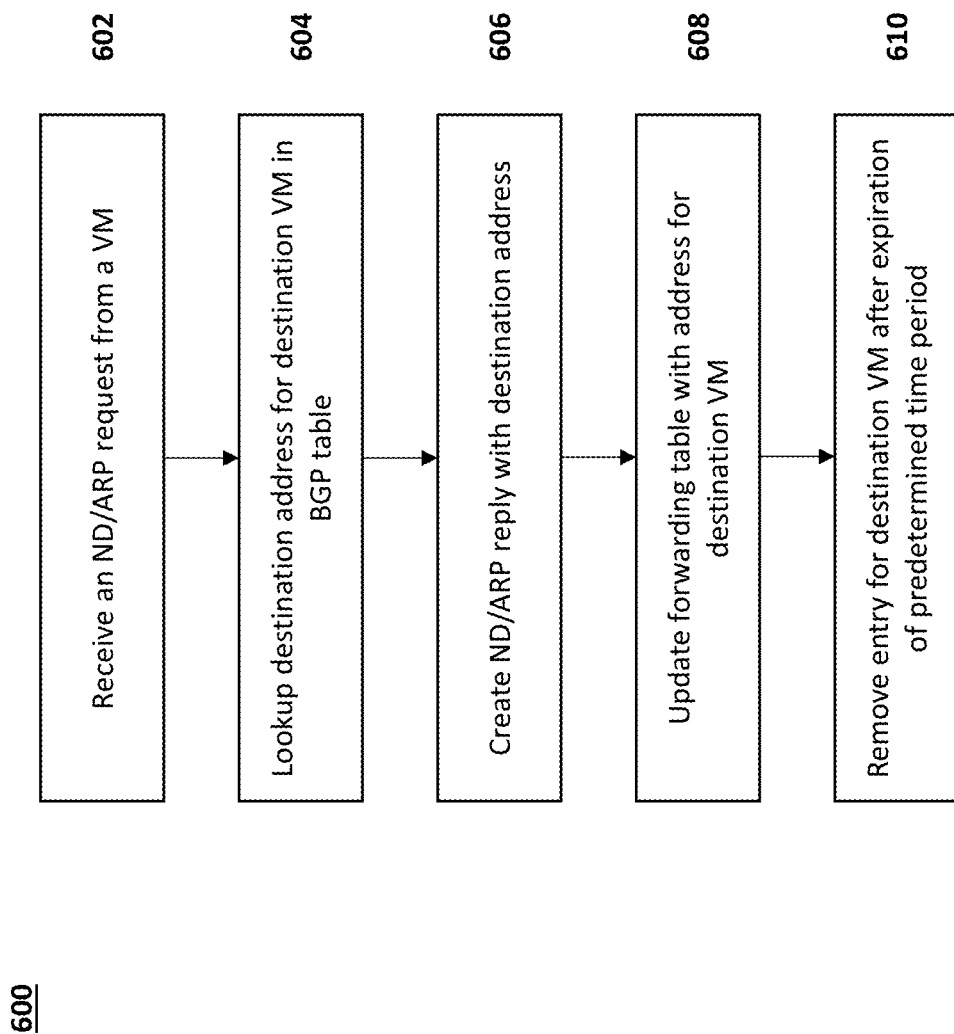
FIG. 6 is a process flow diagram for reducing address protocol resolution flooding in accordance with embodiments of the present disclosure.

FIG. 6 is a process flow diagram 600 for reducing address protocol resolution flooding in accordance with embodiments of the present disclosure. The NVE can receive an ND/ARP request from a VM (602). The NVE can perform a lookup for a destination address for destination VM in a BGP table (604). The BGP table can be populated with VM addresses and corresponding VM identification information by the VIM/Controller. The NVE can create an ND/ARP reply with the destination address (606). The NVE can update its forwarding table with the address for the destination VM (608). The NVE can remove the destination address for the VM after the expiration of a predetermined time period (610).

Basics of Network Service Chaining or Service Function Chains in a Network

To accommodate agile networking and flexible provisioning of network nodes in the network, Service Function Chains (SFC) can be used to ensure an ordered set of Service Functions (SF) to be applied to packets and/or frames of a traffic flow. SFCs provides a method for deploying SFs in a way that enables dynamic ordering and topological independence of those SFs. A service function chain can define an ordered set of service functions that is applied to packets and/or frames of a traffic flow, where the ordered set of service functions are selected as a result of classification. The implied order may not be a linear progression as the architecture allows for nodes that copy to more than one branch. The term service chain is often used as shorthand for service function chain.

Figure 7A:
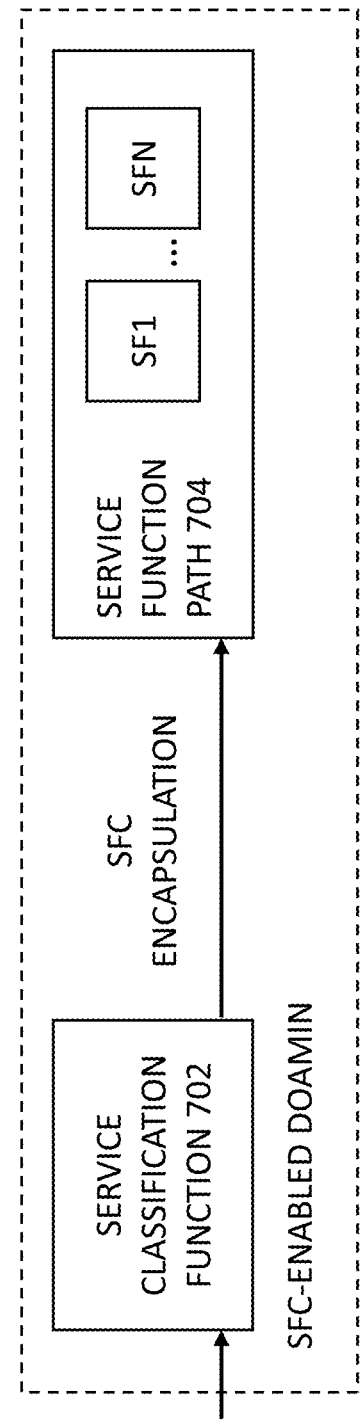
FIG. 7A illustrates a Service Function Chain (SFC), which may include an initial Classification function, as an entry point into a Service Function Path (SFP), according to some embodiments of the disclosure.

FIG. 7A illustrates a Service Function Chain (SFC), which may include an initial service classification function 702, as an entry point into a Service Function Path (SFP) 704 (or service path). The (initial) service classification function 702 prescribes a service path, and encapsulates a packet or frame with the service path information which identifies the service path. The classification potentially adds metadata, or shared context, to the SFC encapsulation part of the packet or frame. The service function path 704 may include a plurality of service functions (shown as "SF1", . . . "SFN").

A service function can be responsible for specific treatment of received packets. A service function can act at the network layer or other OSI layers (e.g., application layer, presentation layer, session layer, transport layer, data link layer, and physical link layer). A service function can be a virtual instance or be embedded in a physical network element such as a service node. When a service function or other modules of a service node is executed by the at least one processors of the service node, the service function or other modules can be configured to implement any one of the methods described herein. Multiple service functions can be embedded in the same network element. Multiple instances of the service function can be enabled in the same administrative SFC-enabled domain. A non-exhaustive list of SFs includes: firewalls, WAN and application acceleration, Deep Packet Inspection (DPI), server load balancers, NAT44, NAT64, HOST_ID injection, HTTP Header Enrichment functions, TCP optimizer, etc. An SF may be SFC encapsulation aware, that is it receives, and acts on information in the SFC encapsulation, or unaware in which case data forwarded to the service does not contain the SFC encapsulation.

A Service Node (SN) can be a physical network element (or a virtual element embedded on a physical network element) that hosts one or more service functions (SFs) and has one or more network locators associated with it for reachability and service delivery. In many standardization documents, "service functions" can refer to the service nodes described herein as having one or more service functions hosted thereon. Service Function Path (SFP) (or sometimes referred simply as service path) relates to the instantiation of a SFC in the network. Packets follow a service path from a classifier through the requisite service functions.

FIGS. 7B-7C illustrate different service paths realized using service function chaining. These service paths can be implemented by encapsulating packets of a traffic flow with a network service header (NSH) or some other suitable packet header which specifies a desired service path (e.g., by identifying a particular service path using service path information in the NSH). In the example shown in FIG. 7B, a service path 720 can be provided between end point 760 and endpoint 780 through service node 706 and service node 710. In the example shown in FIG. 7C, a service path 730 (a different instantiation) can be provided between end point 770 and endpoint 790 through service node 706, service node 708, and service node 712.

Network Service Header (NSH) Encapsulation

Generally speaking, an NSH includes service path information, and NSH is added to a packet or frame. For instance, an NSH can include a data plane header added to packets or frames. Effectively, the NSH creates a service plane. The NSH includes information for service chaining, and in some cases, the NSH can include metadata added and/or consumed by service nodes or service functions. The packets and NSH are encapsulated in an outer header for transport. To implement a service path, a network element such as a service classifier (SCL) or some other suitable SFC-aware network element can process packets or frames of a traffic flow and performs NSH encapsulation according to a desired policy for the traffic flow.

Figure 8:
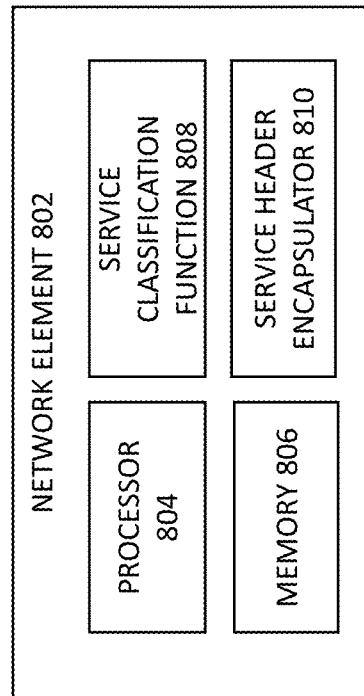
FIG. 8 shows a system view of a Service Chain Function-aware network element for prescribing a service path of a traffic flow, according to some embodiments of the disclosure.

FIG. 8 shows a system view of SFC-aware network element, e.g., such as a (initial) service classifier (SCL), for prescribing a service path of a traffic flow, according to some embodiments of the disclosure. Network element 802 includes processor 804, (computer-readable non-transitory) memory 806 for storing data and instructions. Furthermore, network element 802 includes service classification function 808 and service header encapsulator 810 (both can be provided by processor 804 when processor 804 executes the instructions stored in memory 806).

The service classification function 808 can process a packet of a traffic flow and determine whether the packet requires servicing and correspondingly which service path to follow to apply the appropriate service. The determination can be performed based on business policies and/or rules stored in memory 806. Once the determination of the service path is made, service header encapsulator 810 generates an appropriate NSH having identification information for the service path and adds the NSH to the packet. The service header encapsulator 810 provides an outer encapsulation to forward the packet to the start of the service path. Other SFC-aware network elements are thus able to process the NSH while other non-SFC-aware network elements would simply forward the encapsulated packets as is. Besides inserting an NSH, network element 802 can also remove the NSH if the service classification function 808 determines the packet does not require servicing.

Network Service Headers

A network service header (NSH) can include a (e.g., 64-bit) base header, and one or more context headers. Generally speaking, the base header provides information about the service header and service path identification (e.g., a service path identifier), and context headers can carry opaque metadata (such as the metadata described herein reflecting the result of classification). For instance, an NSH can include a 4-byte base header, a 4-byte service path header, and optional context headers. The base header can provide information about the service header and the payload protocol. The service path header can provide path identification and location within a path. The (variable length) context headers can carry opaque metadata and variable length encoded information. The one or more optional context headers make up a context header section in the NSH. For instance, the context header section can include one or more context header fields having pieces of information therein, describing the packet/frame. Based on the information in the base header, a service function of a service node can derive policy selection from the NSH. Context headers shared in the NSH can provide a range of service-relevant information such as traffic classification. Service functions can use NSH to select local service policy.

Service Nodes and Proxy Nodes

Figure 9:
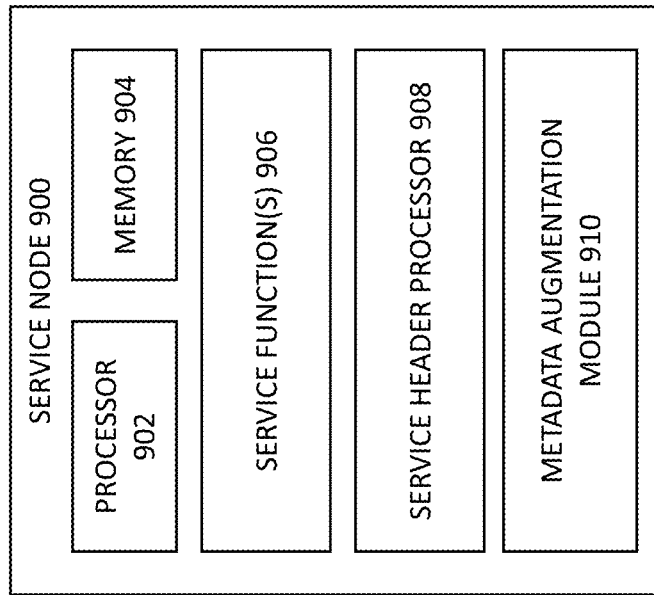
FIG. 9 shows a system view of a service node, according to some embodiments of the disclosure.

Once properly encapsulated, the packet having the NSF is then forwarded to one or more service nodes where service(s) can be applied to the packet/frame. FIG. 9 shows a system view of a service node, according to some embodiments of the disclosure. Service node 900, generally a network element, can include processor 902, (computer-readable non-transitory) memory 904 for storing data and instructions. Furthermore, service node 900 includes service function(s) 906 (e.g., for applying service(s) to the packet/frame, classifying the packet/frame) and service header processor 908. The service functions(s) 906 and service header processor 906 can be provided by processor 902 when processor 902 executes the instructions stored in memory 904. Service header processor 908 can extract the NSH, and in some cases, update the NSH as needed. For instance, the service header processor 908 can decrement the service index if a service index=0 is used to indicate that a packet is to be dropped by the service node 900. In another instance, the service header processor 908 or some other suitable module provide by the service node can update context header fields if new/updated context is available.

Within the context of the application, "metadata" refers to one or more pieces of information (e.g., bits of data, encoded values) in a context header section of a network service header. Metadata can refer to contents of the entire context header section, which can include the contents of one or more context header fields describing various attributes of the packet/frame. Metadata can also refer to contents of one individual context header field or a subset of context header fields in the context header section.

Moreover, the terms "first service node" and "second service node" does not necessarily imply that the "first service node" and the "second service node" are the first and second service nodes at the beginning of the service path that the packet/frame reaches as the packet/frame traverses over the service path. For instance, the first service node can be any suitable one of the service nodes among many service nodes in the service path (e.g., third one the packet/frame reaches as it traverses the service path, fourth one, fifth one, etc.). The second service node can be any suitable one of the service node(s) subsequent to the first service node downstream in the service path.

Within the context of the disclosure, a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise wide area network (WAN) deployment, The architecture of the present disclosure may include a configuration capable of transmission control protocol/internet protocol (TCP/IP) communications for the transmission and/or reception of packets in a network.

As used herein in this Specification, the term 'network element' is meant to encompass any of the aforementioned elements, as well as servers (physical or virtually implemented on physical hardware), machines (physical or virtually implemented on physical hardware), end user devices, routers, switches, cable boxes, gateways, bridges, loadbalancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the network service header features/operations thereof. This may be inclusive of appropriate algorithms and communication protocols that allow for the effective exchange of data or information.

In one implementation, nodes with NSH capabilities may include software to achieve (or to foster) the functions discussed herein for providing the NSH-related features/functions where the software is executed on one or more processors to carry out the functions. This could include the implementation of instances of service functions, service header processors, metadata augmentation modules and/or any other suitable element that would foster the activities discussed herein. Additionally, each of these elements can have an internal structure (e.g., a processor, a memory element, etc.) to facilitate some of the operations described herein. In other embodiments, these functions may be executed externally to these elements, or included in some other network element to achieve the intended functionality. Alternatively, these nodes may include software (or reciprocating software) that can coordinate with other network elements in order to achieve the functions described herein. In still other embodiments, one or several devices may include any suitable algorithms, hardware, software, components, modules, interfaces, or objects that facilitate the operations thereof.

In certain example implementations, the NSH-related functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases or metadata disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, service nodes, etc.) can include memory elements for storing information to be used in achieving the NSH-related features, as outlined herein. Additionally, each of these devices may include a processor that can execute software or an algorithm to perform the NSH-related features as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of using and augmenting NSH metadata, as potentially applied to a myriad of other architectures.

It is also important to note that the various steps described herein illustrate only some of the possible scenarios that may be executed by, or within, the nodes with NSH capabilities described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by nodes with NSH capabilities in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. One or more computer readable, non-transitory storage media encoded with software comprising computer executable instructions and, when the software is executed, operable to:
   receive an address resolution protocol (ARP) request message from a requesting virtual machine, the ARP request message comprising a request for a destination address for a destination virtual machine, the destination address comprising a destination hardware address and a destination media access control address;
   augment the ARP request message with a network service header (NSH), the NSH identifying an ARP service function;
   forward the ARP request message with the NSH to the ARP service function;
   when the destination address for the destination virtual machine is not present in an ARP service function database, receive an ARP reply message from the ARP service function with a flag indicating no entry;
   when the destination address for the destination virtual machine is present in the ARP service function database and the destination address is not local, receive the ARP reply message from the ARP service function with a flag indicating the destination address; and
   determine, from the ARP reply message, whether the destination address for the destination virtual machine is present in the ARP service function database based on the flag indicating no entry or the flag indicating the destination address.

2. The one or more computer readable, non-transitory storage media of claim 1, wherein the software is further operable to:
   forward the ARP reply message to the requesting virtual machine if it is determined that the destination virtual machine is present in the ARP service function database, the ARP reply message including the destination address for the destination virtual machine.

3. The one or more computer readable, non-transitory storage media of claim 2, wherein the software is further operable to:
   update a forwarding table with the destination address for the destination virtual machine if it is determined that the destination virtual machine is present in the ARP service function database.

4. The one or more computer readable, non-transitory storage media of claim 1, wherein the software is further operable to:
   transmit the ARP request message to one or more network elements in a network if it is determined that the destination address for the destination virtual machine is not present in the ARP service function database.

5. The one or more computer readable, non-transitory storage media of claim 1, wherein the flag indicating no entry is an indication in metadata and the flag indicating the destination address is another indication in metadata.

6. A network element for performing address resolution, the network element comprising:
   at least one memory element having instruction stored thereon;
   a service classifier node; and
   at least one processor coupled to the at least one memory element and configured to execute the instructions to cause the service classifier node to:

receive an address resolution protocol (ARP) request message from a requesting virtual machine, the ARP request message comprising a request for a destination address for a destination virtual machine, the destination address comprising a destination hardware address and a destination media access control address;

augment the ARP request message with a network service header (NSH), the NSH identifying an ARP service function;

forward the ARP request message with the NSH to the ARP service function;

when the destination address for the destination virtual machine is not present in an ARP service function database, receive an ARP reply message from the ARP service function with a flag indicating no entry;

when the destination address for the destination virtual machine is present in the ARP service function database and the destination address is not local, receive the ARP reply message from the ARP service function with a flag indicating the destination address; and determine, from the ARP reply message, whether the destination address for the destination virtual machine is present in the ARP service function database based on the flag indicating no entry or the flag indicating the destination address.

7. The network element of claim 6, wherein the at least one processor is configured to cause the network element to:
forward the ARP reply message to the requesting virtual machine if it is determined that the destination virtual machine is present in the ARP service function database, the ARP reply message including the destination address for the destination virtual machine.

8. The network element of claim 7, wherein the at least one processor is configured to cause the network element to:
update a forwarding table with the destination address for the destination virtual machine if it is determined that the destination virtual machine is present in the ARP service function database.

9. The network element of claim 7, wherein the at least one processor is configured to cause the network element to:
transmit the ARP request message to one or more network elements in a network if it is determined that the destination address for the destination virtual machine is not present in the ARP service function database.

* * * * *